(12) United States Patent
Kanathipan et al.

(10) Patent No.: US 12,374,899 B2
(45) Date of Patent: Jul. 29, 2025

(54) MODULAR SINGLE-STAGE STEP-UP PV CONVERTER WITH INTEGRATED POWER BALANCING FEATURE

(71) Applicants: Kajanan Kanathipan, Toronto (CA); John Lam, Oakville (CA)

(72) Inventors: Kajanan Kanathipan, Toronto (CA); John Lam, Oakville (CA)

( * ) Notice: Subject to any disclaimer, the term of this patent is extended or adjusted under 35 U.S.C. 154(b) by 64 days.

(21) Appl. No.: 18/564,700

(22) PCT Filed: May 12, 2022

(86) PCT No.: PCT/CA2022/050755
§ 371 (c)(1),
(2) Date: Nov. 28, 2023

(87) PCT Pub. No.: WO2022/246540
PCT Pub. Date: Dec. 1, 2022

(65) Prior Publication Data
US 2024/0243585 A1    Jul. 18, 2024

Related U.S. Application Data

(60) Provisional application No. 63/194,836, filed on May 28, 2021, provisional application No. 63/324,331, filed on Mar. 28, 2022.

(51) Int. Cl.
*H02J 1/00*   (2006.01)
*H02J 3/46*   (2006.01)
(Continued)

(52) U.S. Cl.
CPC .............. *H02J 3/46* (2013.01); *H02M 1/0043* (2021.05); *H02M 1/0058* (2021.05);
(Continued)

(58) Field of Classification Search
CPC ....................................................... H01L 22/00
See application file for complete search history.

(56) References Cited

U.S. PATENT DOCUMENTS

2013/0249300 A1\*   9/2013   Fishman ................. H10F 77/95
                                                           307/82
2015/0270709 A1\*   9/2015   Abu Qahouq ........ H10F 77/955
                                                           307/29
(Continued)

OTHER PUBLICATIONS

International Search Report from corresponding PCT/CA2022/050755, dated Aug. 12, 2022.
(Continued)

*Primary Examiner* — Jared Fureman
*Assistant Examiner* — Esayas G Yeshaw
(74) *Attorney, Agent, or Firm* — Grossman, Tucker, Perreault & Pfleger PLLC

(57) ABSTRACT

A modular single-stage photovoltaic step-up converter system with integrated power balancing, the converter system comprising: an input stage comprising at least one converter module, the at least one converter module comprising a single voltage-sensor based maximum power point (MPP) tracking controller and a power circuit; and an output stage comprising an active voltage quadrupler (VQ) circuit for achieving balanced output voltages amongst each of the at least one converter modules, and wherein the least one converter modules are coupled together in a circular configuration.

26 Claims, 20 Drawing Sheets

(51) Int. Cl.

| | |
|---|---|
| *H02M 1/00* | (2006.01) |
| *H02M 1/14* | (2006.01) |
| *H02M 3/00* | (2006.01) |
| *H02M 3/335* | (2006.01) |
| *H02S 50/10* | (2014.01) |

(52) U.S. Cl.
CPC .......... *H02M 1/0077* (2021.05); *H02M 1/14* (2013.01); *H02M 3/01* (2021.05); *H02M 3/33571* (2021.05); *H02M 3/33576* (2013.01); *H02S 50/10* (2014.12); *H02J 2300/26* (2020.01)

(56) References Cited

U.S. PATENT DOCUMENTS

| | | | | |
|---|---|---|---|---|
| 2017/0133921 | A1* | 5/2017 | Okumura | H02M 7/537 |
| 2019/0006851 | A1* | 1/2019 | Gu | H02S 40/34 |
| 2019/0341776 | A1* | 11/2019 | Au | H02J 3/388 |
| 2019/0393826 | A1* | 12/2019 | Lai | H02S 40/32 |
| 2023/0318306 | A1* | 10/2023 | Elfouly | H02J 3/08 700/286 |

OTHER PUBLICATIONS

Written Opinion from corresponding PCT/CA2022/050755, dated Aug. 12, 2022.
Ahmed et al., "An Enhanced Adaptive P&O MPPT for Fast and Efficient Tracking Under Varying Environmental Conditions", IEEE Transactions on Sustainable Energy, vol. 9, No. 3, Jul. 2018, pp. 1487-1496.
Alli et al., "MPPT and Output Voltage Control of Photovoltaic Systems Using a Single-Switch DC-DC Converter", IEEE International Energy Conference, Apr. 6, 2016, France, pp. 1-6.
Diao et al., "A Novel Voltage Balance Topology With High Efficiency and Low Current STress for MVdc Interface of Distributed PV", IEEE Transactions on Industrial Electronics, vol. 70, No. 4, Apr. 2023, pp. 3867-3877.
Hu et al., "Maximum Power Point Tracking Control of a High Power DC-DC Converter for PV Integration in MVDC Distribution Grids", IEEE Applied Power Electronics Conference and Exposition, 2017, Tampa, FL, pp. 1259-1266.
Kadri et al., "Nondissipative String Current Diverter for Solving the Cascaded DC-DC Converter Connection Problem in Photovoltaic Power Generation System", IEEE Transactions on Power Electronics, vol. 27, No. 3, pp. 1249-1258, Mar. 2012.
Killi et al., "An Adaptive Voltage-Sensor-Based MPPT for Photovoltaic Systems With SEPIC Converter Including Steady-State and Drift Analysis", IEEE Trans. on Industrial Electronics, vol. 62, No. 12, pp. 7609-7619, Dec. 2015.
Killi et al., "Voltage-Sensor-Based MPPT for Stand-Alone PV Systems Through Voltage Reference Control," IEEE Journal of Emerging and Selected Topics in Power Electronics, vol. 7, No. 2, pp. 1399-1407, Jun. 2019.
Li et al., "Input-Independent and Output-Series Connected Modular DC-DC Converter With Intermodule Power Balancing Units for MVdc Integration of Distributed PV," in IEEE Transactions on Power Electronics, vol. 35, No. 2, pp. 1622-1636, Feb. 2020.
Lohmeier et al., "A current-sensorless MPPT quasi-double-boost converter for PV systems," 2011 IEEE Energy Conversion Congress and Exposition, 2011, Nebraska, pp. 1069-1075.
Lu et al., "A Three-Port Converter Based Distributed DC Grid Connected PV System With Autonomous Output Voltage Sharing Control," in IEEE Transactions on Power Electronics, vol. 34, No. 1, pp. 325-339, Jan. 2019.
Metry et al., "A Variable Stepsize MPPT for Sensorless Current Model Predictive Control for Photovoltaic Systems," 2016 IEEE Energy Conversion Congress and Exposition (ECCE), pp. 1-8.
Metry et al., "MPPT of Photovoltaic Systems Using Sensorless Current-Based Model Predictive Control," IEEE Transactions on Industry Applications, vol. 53, No. 2, pp. 1157-1167, Mar./Apr. 2017.
Ren "The First decade: 2004-2014" report. (http//www.ren21.net), France, pp. 1-48.
Ren "2020 Global Status Report" report. (https://www.ren21.net/wpcontent/uploads/2019/05/gsr_2020_full_report_en.pdf), France, pp. 1-367.
Zhuang et al., "A Multiport Modular DC-DC Converter with Low-Loss Series LC Power Balancing Unit for MVDC Interface of Distributed Photovoltaics", IEEE Transactions on Power Electronics, 2020, pp. 1-14.

* cited by examiner

Figure 11a
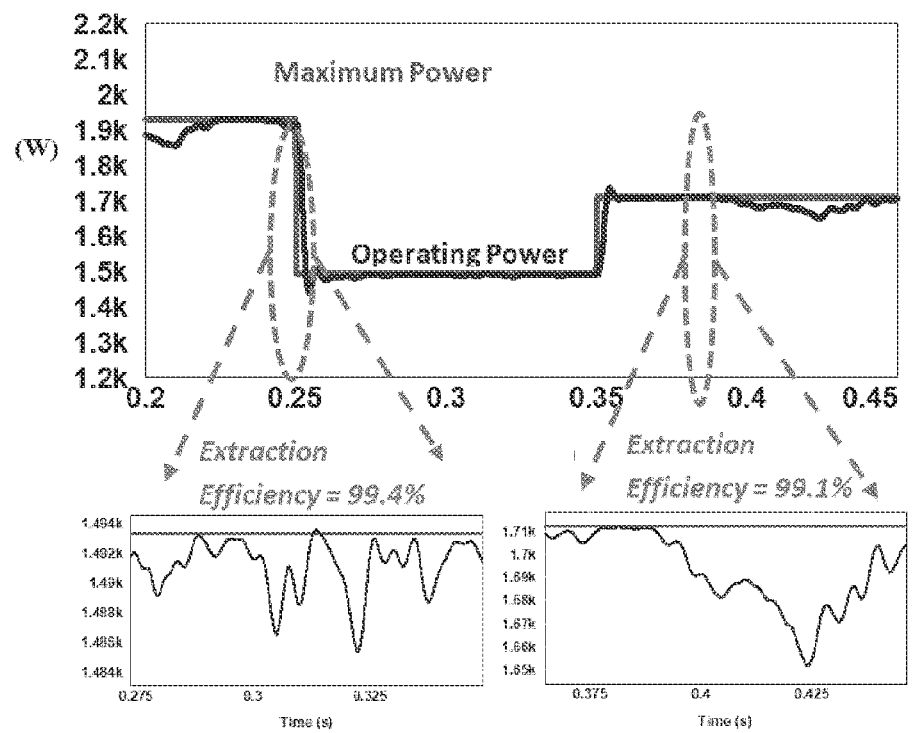
Figure 11b
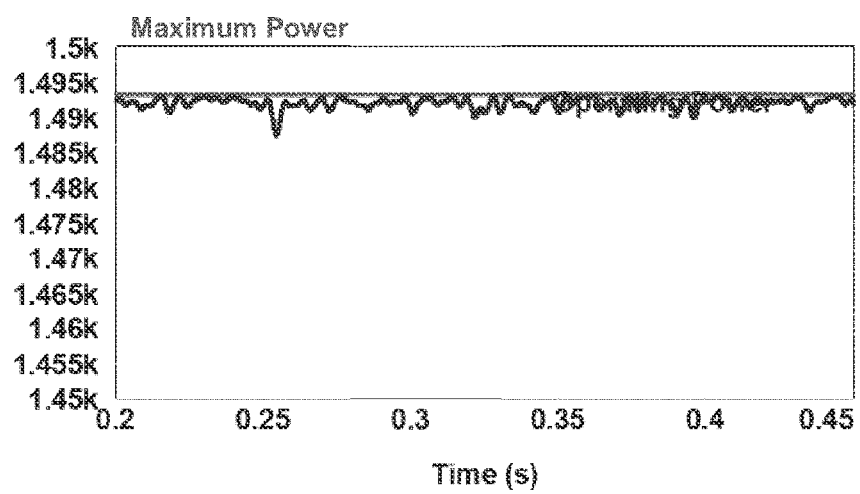
Figure 11c

MODULAR SINGLE-STAGE STEP-UP PV CONVERTER WITH INTEGRATED POWER BALANCING FEATURE

FIELD

Aspects of the disclosure relate to medium and large-scale photovoltaic (PV) power conversion.

BACKGROUND

Due to the detrimental impact of greenhouse gases on our environment there has been a shift towards the use of renewable energy resources. These resources are abundant in nature and environmentally friendly compared with conventional energy resources such as fossil fuels. Photovoltaic (PV) energy has the highest growth rate among all the renewable energy resources, with its global capacity increased from 5.1 GW to 625 GW from 2005 to 2019 [1-2]. As the output voltage of an individual PV panel is low, multiport modular converters are becoming a popular power distribution structure to match the DC-grid voltage. However, these topologies must be able to achieve a high voltage gain, provide individual maximum power point (MPP) tracking, and balance the output voltage of each module [3-7].

A basic photovoltaic energy based multiport modular MVdc system is shown in FIG. 1. This is a two-stage system where the first stage performs maximum power extraction and step-up while the second stage provides an additional step-up while regulating the modules output voltage. This approach requires two DC-DC converters, and therefore increases the size and cost of the system, while lowering the efficiency due to processing the power multiple times [7]. Instead of relying on large step-up converters, one option is a multi-bus approach which utilizes two or more voltage busses to help transfer the power from the input to the load [6].

Another approach is the input-independent, output-series (IIOS) topology shown in FIG. 2 which typically employs full-bridge converters due to their isolation capabilities and large-step up gain. However, achieving a large gain requires a significant transformer turns ratio, which leads to a large and bulky system. Further, to balance the modules output voltage this approach requires the use of additional power balance unit (PBU) consisting of semiconductor or passive components, adding to the size and cost and increasing the complexity. For example, [3-5] requires the use of two switches and an inductor to perform voltage balancing. To minimize the required components, [7] integrated two switches into a voltage doubler and utilizes an additional inductor to allow for power flow between modules. However, this still results in additional components being required to balance the output voltage.

In order for the topologies shown in FIG. 1 to extract the maximum power from their input PV panels, MPP controllers are required. These controllers need the input voltage and current of the converter to directly calculate the operating panel power and determine how to move towards the maximum operating point. To ensure accurate measurements the input voltage and current need to be stable, requiring the use of large electrolytic input capacitors. These capacitors are known to have a significantly lower life expectancy than the converter itself which leads to instability, and increased maintenance and increased associated costs.

Obtaining the voltage measurement can simply be performed using a resistive bridge consisting of two resistors where the midpoint is sent to the controller. Measuring the input current is more complex and is typically done through the use of a Kelvin sense resistor or a Hall-effect sensor. Kelvin sense resistors are placed in series with the desired current which results in a voltage drop. This voltage is sent to a controller and with the knowledge the value of the sense resistor, the current can be calculated. The larger this resistance the more accurate the current measurement is, however, this also results in increased power loss. While Hall effect sensors can provide accurate (<1% error) current measurements without power loss, however, the sensors require additional power supplies to operate which results in a larger system and a higher cost.

To circumvent issues with current sensors, several papers in literature have discussed current sensor-less maximum power tracking techniques. In [8, 9] two voltage sensors, known converter parameter values, and the load resistance are used to estimate the input current such that P&O can be employed. In the authors utilize a double capacitor interface to estimate the PV panel current, a method that requires two voltage sensors and knowledge of the input inductance and capacitance. In both these cases it can be understood that the controllers rely on known converter parameters and as a result their MPP algorithms must be tuned for different converters. Also, parameters of passive converter components can change overtime, leading to incorrect estimations and low tracking efficiency. Instead of estimating the operating current, other MPP tracking methods makes use of irradiance, temperature, and voltage sensors [12]. The measured irradiance and temperature are sent into a trained neural network to determine the approximate voltage required to operate at the MPP (Vmp) at each operating condition. To reduce the cost of multiple sensors, tracking methods that consist of only a single voltage sensor have been presented [10,12-13]. By measuring the input voltage and having knowledge of the operating duty cycle, the controller can determine whether the system is at the MPP. However, as with the previously discussed current-senseless techniques, the controllers are designed for a specific power converter which diminishes their range of application.

SUMMARY

In one of its aspects, a modular single-stage photovoltaic step-up converter system with integrated power balancing, the converter system comprising:
  an input stage comprising at least one converter module, the at least one converter module comprising a single voltage-sensor based maximum power point (MPP) tracking controller and a power circuit, wherein the power circuit in each at least one converter module comprises an integrated boost and a CLL resonant converter which allows for both MPP tracking and soft-switching operation; and
  an output stage comprising an active voltage quadrupler (VQ) circuit for achieving balanced output voltages amongst each of the at least one converter modules, and wherein the least one converter modules are coupled together by an output inductor, along with duty ratio control of the active VQ circuit, and whereby natural output voltage balancing is achieved without using additional power circuit components.

In another of its aspects, a modular single-stage photovoltaic step-up converter system with integrated power balancing, the converter system comprising:

an input stage comprising at least one converter module, the at least one converter module comprising a single voltage-sensor based maximum power point (MPP) tracking controller and a power circuit; and an output stage comprising an active voltage quadrupler (VQ) circuit for achieving balanced output voltages amongst each of the at least one converter modules, and wherein the least one converter modules are coupled together in a circular configuration.

In another of its aspects, a modular single-stage photo-voltaic step-up converter system with integrated power balancing, the converter system comprising:

an input stage comprising a first converter module and a second converter module, each of the converter modules comprising a single voltage-sensor based maximum power point (MPP) tracking controller and a power circuit; and an output stage comprising an active voltage quadrupler (VQ) circuit coupled to the first converter module and the second converter module.

In another of its aspects, a modular single-stage photo-voltaic step-up converter system for a photo-voltaic (PV) array, the converter system comprising:

an input stage comprising a first converter module and a second converter module, each of the converter modules comprising a single voltage-sensor based maximum power point (MPP) tracking controller and a power circuit;

an output stage comprising an active voltage quadrupler (VQ) circuit coupled to the first converter module and the second converter module; and wherein inputs to the first converter module and the second converter module are connected in parallel, and connected to the PV array.

In another of its aspects, a modular single-stage photo-voltaic step-up converter system with integrated power balancing, the converter system comprising:

an input stage comprising a first converter module and a second converter module, each of the module comprising a single voltage-sensor based maximum power point (MPP) tracking controller and a power circuit; and an output stage comprising an active voltage quadrupler (VQ) circuit for achieving balanced output voltages amongst each of the converter modules, wherein the VQ circuit comprises switches which are gated asymmetrically, whereby direction of power flow is controllable and the power can be shared with either the first converter module and the second converter module regardless of the recipient module's operating state.

Advantageously, the multi-port PV step-up power converter for MVdc system is capable of independent single-sensor maximum power extraction and output power balancing. The DC-DC converter utilizes a two-switch integrated boost and an asymmetrical pulse with modulated (APWM) CLL resonant converter along with an active voltage quadrupler (VQ), which allows the system to achieve a high step-up gain without the need of a large and bulky transformer. The resonant inductor is coupled with the active VQ to provide isolation between the input and the output, and the output inductor of each stage is coupled together to allow for power flow between the VQs, which in turn allows for the output voltage of each stage to be regulated without the need of additional components. Furthermore, the MPP tracker (MPPT) performs with a single voltage sensor and operates independently of the power balancer.

In addition, the single-stage modular step-up converter comprises an integrated MPPT and does not require separate power balancing units to achieve output voltage balancing among all the converter modules. Furthermore, the PV MPPT control scheme in each module requires only one voltage sensing control loop, as opposed to conventional MPPT technique that requires an additional current sensing loop, in one example. The input filtering capacitance is significantly reduced by at least 20%, and as a result, small size long lifespan film capacitors can be used in the converter. The single-stage modular step-up converter is also capable of loss-less switching for over 90% of the operating range, with >96% efficiency. The multi-port PV step-up power converter may be implemented in PV farms (with medium voltage grid structure) and solar powered EV charging stations.

BRIEF DESCRIPTION OF THE DRAWINGS

FIG. 11a shows operating power of module 1;

FIG. 11b is a zoom-in of operating power;

FIG. 11c shows operating power of module 2;

DETAILED DESCRIPTION

Figure 1:
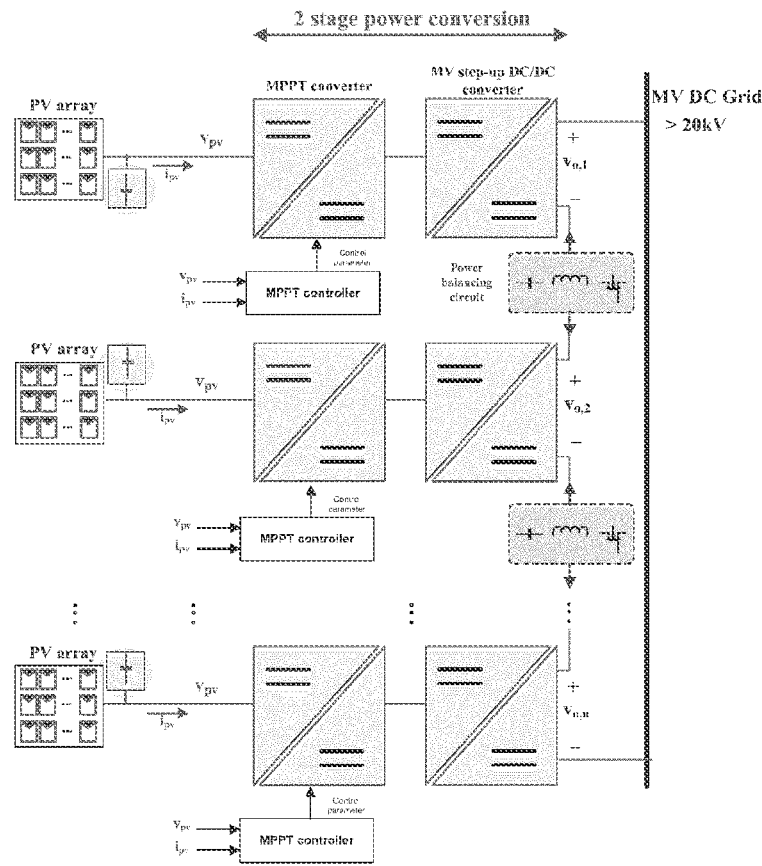
FIG. 1 shows one prior art configuration with separate MPPT and power balancing units and input capacitor banks.
Figure 2:
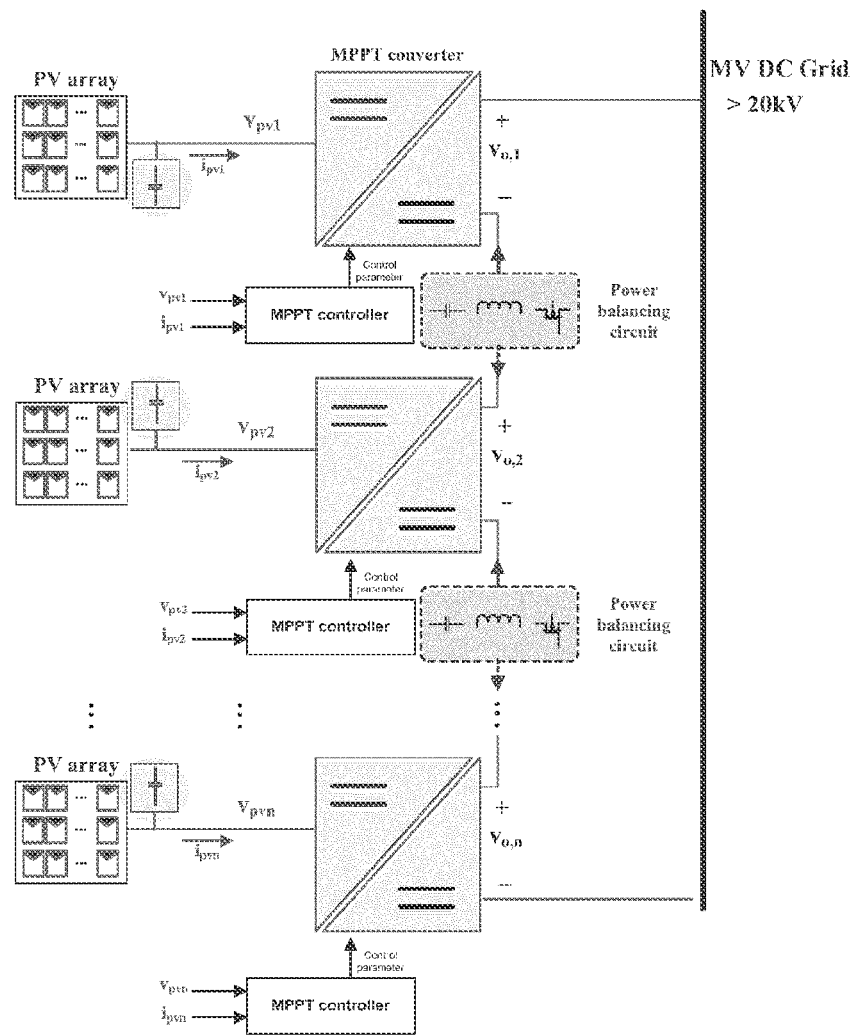
FIG. 2 shows another prior art configuration with separate MPPT and power balancing units and input capacitor banks.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Figure 3:
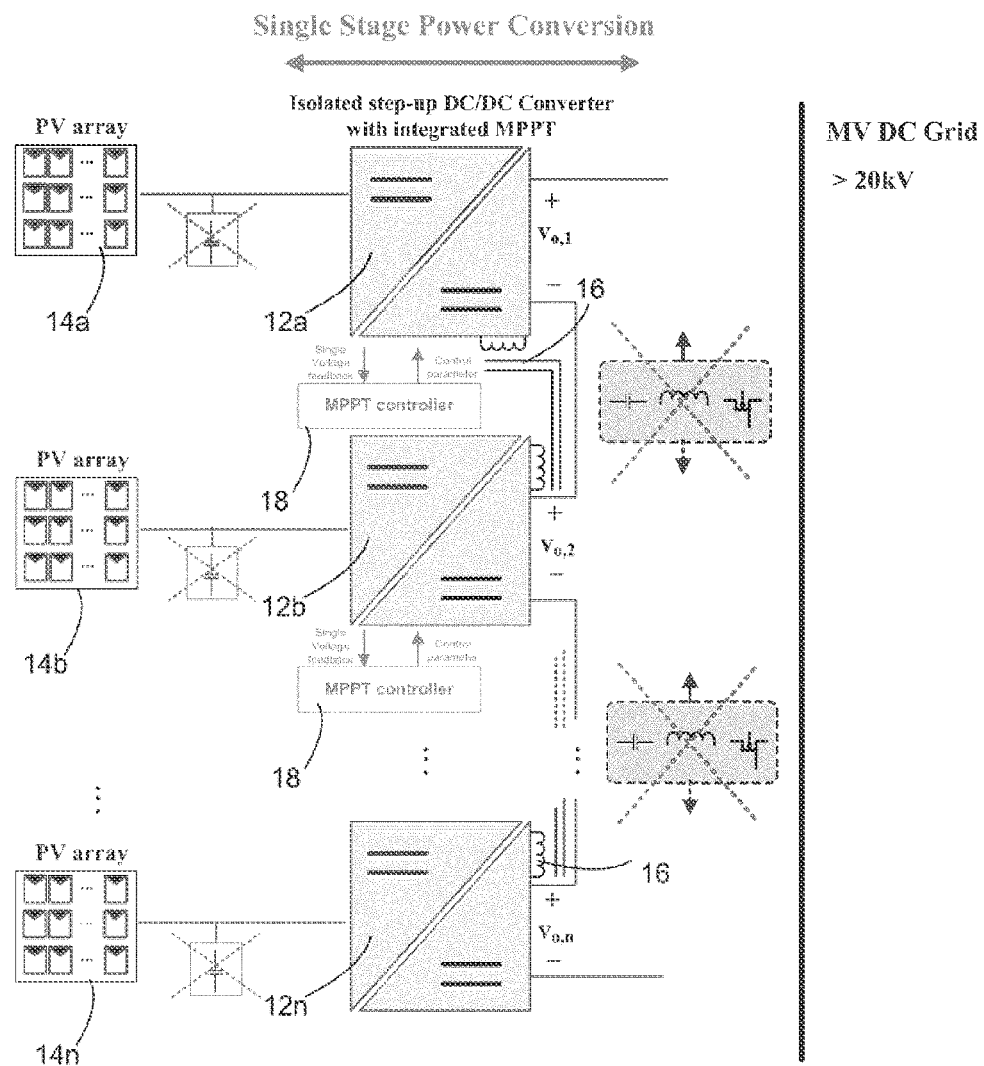
FIG. 3 shows a multi-port PV step-up power converter for a MVdc system, in one implementation.

Referring to FIG. 3, there is shown a multi-port PV step-up power converter 10 for a MVdc system capable of independent single-sensor maximum power extraction and output power balancing. The DC-DC converter utilizes a two-switch integrated boost stage and an asymmetrical pulse with modulated (APWM) CLL resonant converter along with an active voltage quadrupler (VQ) 12. This allows the system 10 achieves a high step-up gain without the need of a large and bulky transformer. A resonant inductor is coupled with the active VQ 12 to provide isolation between the input and the output. Each stage is coupled to PV array 14, and the output inductor of each stage is coupled together to allow for power flow between the VQ's, which in turn allows for the output voltage of each stage to be regulated without the need of additional components. In addition, MPP tracker 18 performs with a single voltage sensor and operates independently of the power balancer.

Figure 4:
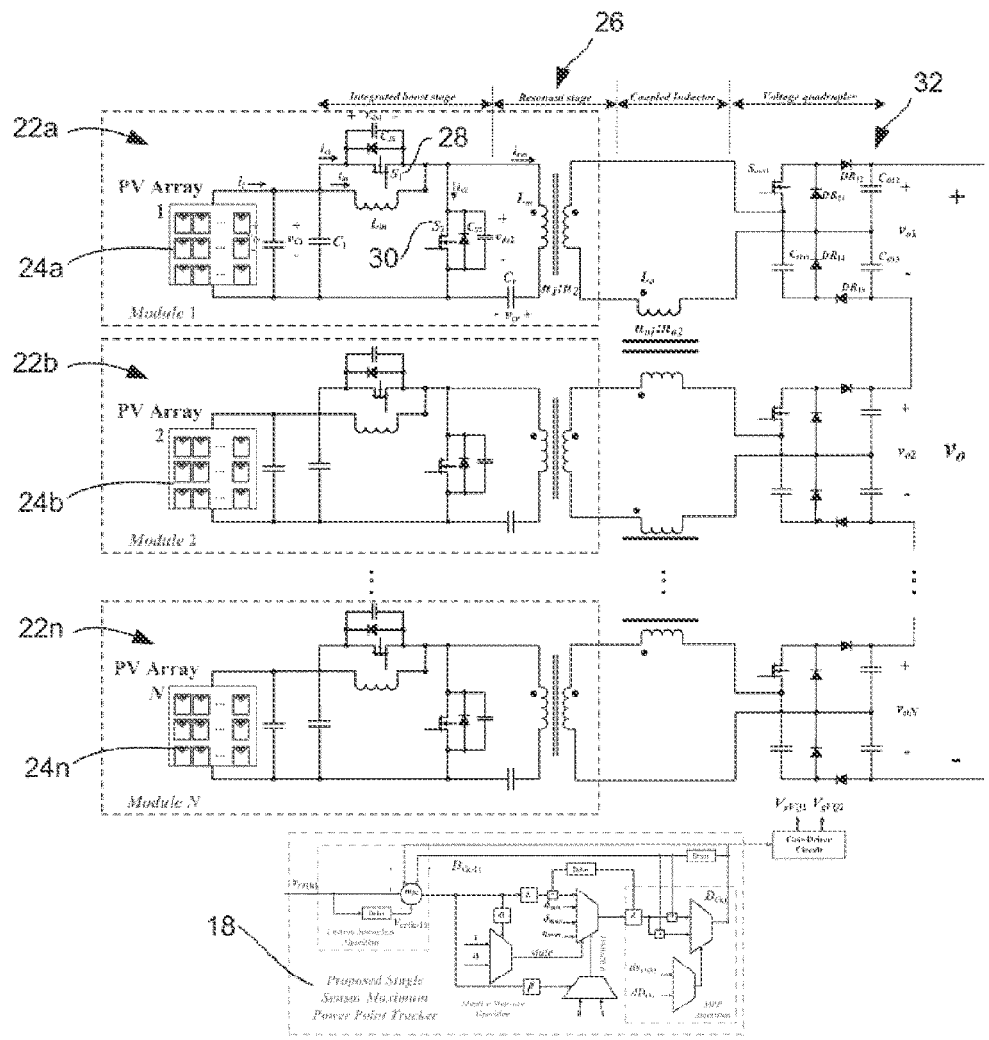
FIG. 4 shows a modular system comprising an asymmetrical PWM resonant converter with an integrated boost stage for a PV application.

Now looking at FIG. 4, there is shown a photovoltaic energy based multi-port MVdc system 20 in one implementation. Each module 22a-n comprises input PV array 24 is connected to an integrated boost and APWM resonant converter 26. The duty cycle of both switches $S_1$ 28 and $S_2$ 30 are controlled to achieve MPPT operation, for example, by MPP tracker 18. A CLL resonant converter is utilized and the resonant inductor ($L_r$) is coupled with an active VQ to allow for isolation and to further increase the overall gain.

Figure 5:
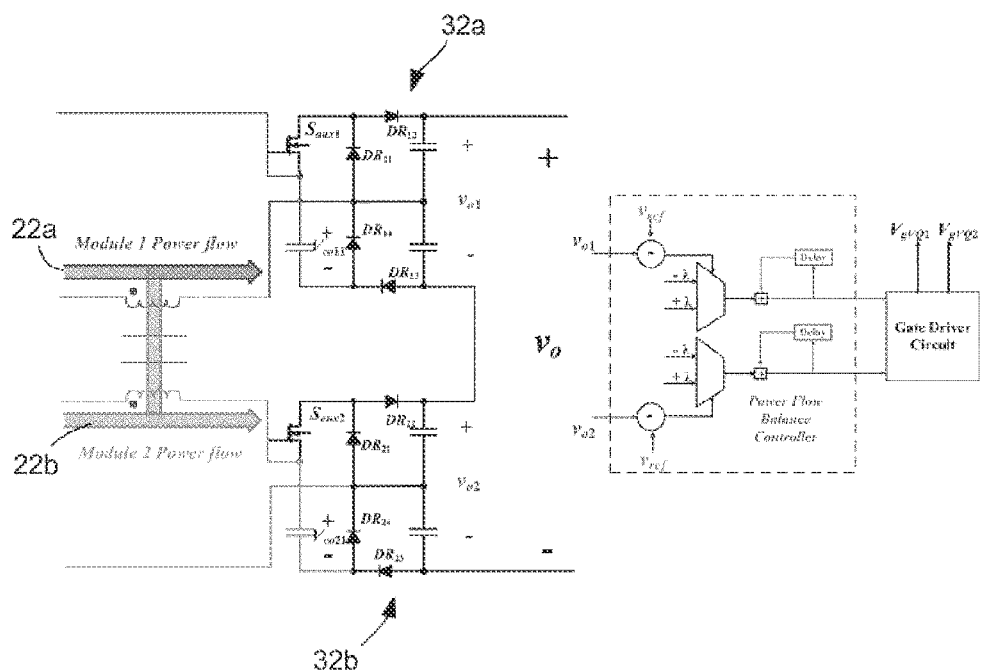
FIG. 5 shows a power balancing technique.

One feature of modular system 20 is equally distributed voltage across the module 22 outputs. As the outputs are connected in series at the output, they share the same output current. If one module 22a operates at a higher or lower power than another module 22b, their output voltage will be mismatched. As a result, to equally distribute the output voltage when the outputs are connected in series, an alternate power flow path is employed. As seen in FIG. 5, by coupling the output inductor of the converters modules an alternate path is created and by controlling the VQ switch the power flow can be set such that the voltage across each output module is constant. The green (top) arrow represents the power flow from the top module 22a to voltage quadrupler 32 while the orange (bottom) arrow represents the power flow from the bottom module 22b to voltage quadrupler 32. The coupling of the output inductor implies the voltage across one modules inductor is a function of the current flowing through the other inductor (1), (2) where $L_o$ is the output inductance, $i_{res12}$ is the secondary side resonant current of the top module 22a, and $i_{res22}$ is the secondary side resonant current of the bottom module 22b. For simplicity it is assumed the turns ratio between the coupled inductor is 1:1.

$$v_{Lo1} = L_o \frac{di_{res12}}{dt} + L_o \frac{di_{res22}}{dt} \qquad (1)$$

$$v_{Lo2} = L_o \frac{di_{res12}}{dt} + L_o \frac{di_{res22}}{dt} \qquad (2)$$

In a typical VQ the voltage across the front two capacitors are $V_o/4$. In one exemplary implementation, one of the capacitors is replaced with a switch which means this relation no longer holds true. Instead, the duty cycle of this switch impacts the voltage across the front capacitor. The larger the duty cycle, the larger the voltage across the front capacitor. As a node of this capacitance is connected to the coupled inductor, it can be understood controlling the capacitor voltage will impact the current on each side of the inductor and in turn affect the power flow (3).

$$v_{Lo2} = v_{co1} - v_{Lm2} \qquad (3)$$

$$M_{CLL} = \frac{1}{\sqrt{\left(\frac{1+\omega_r^2 Q^2 \frac{1}{\omega_r^2}(1+k)(Q)^2}{1+\omega_r^2 Q^2}\right)^2 + \left(\frac{Q-(1+k)Q^2}{\omega_r(1+\omega_r^2 Q^2)}\right)^2}} \qquad (4)$$

$$Q = \frac{\omega_0 \times L_{eq}}{R_{ac}} \qquad (5)$$

$$k = \frac{L_o}{\frac{n_2^2}{n_1} \times L_m} \qquad (6)$$

$$\omega_r = \frac{\omega}{\omega_0} \qquad (7)$$

$$M = \frac{\sqrt{2(1-\cos(2\pi(1-D)))}}{\sqrt{\left(\frac{1+\omega_r^2 Q^2 - \frac{1}{\omega_r^2}(1+k)(Q)^2}{1+\omega_r^2 Q^2}\right)^2 + \left(\frac{Q-(1+k)Q^2}{\omega_r(1+\omega_r^2 Q^2)}\right)^2}} \qquad (8)$$

Figure 6:
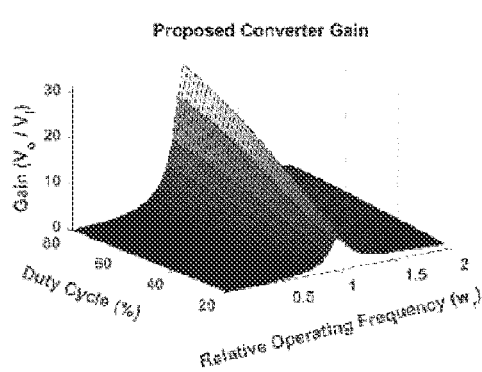
FIG. 6 shows a total voltage gain of a single module.

The overall gain of a single sub-module 22a can be obtained by combining the gain of each individual stage. The output voltage of the boost stage forms the input square voltage of the second stage. (3) provides the gain of the CLL resonant stage where Q is the quality factor (5), k is the ratio between the resonant inductance and the output inductance (6), N is the turns ratio of the isolating coupled inductor, and $w_r$ is the ratio between the angular resonant frequency and the operating frequency (7). The gain of the boost stage is the same as a regular boost converter. The total gain of a single module 22n is provided in (8) and a plot this gain as a function of duty cycle and operating frequency is shown in FIG. 6.

Figure 7:
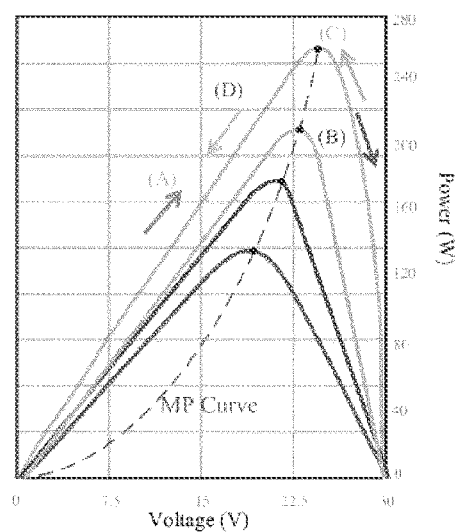
FIG. 7 shows operation location for the four possible P&O scenarios.

Generally, PV panels directly connected to loads are unable to reach their maximum operating point due to impedance mismatch. When a power converter is interfaced between the panel and the load, a controller can vary an operating parameter of the converter such that the maximal amount of PV energy is extracted. Typically, when perturb and observe (P&O) based MPPT controllers are employed, a voltage and current sensor measure the panel's operating voltage and current to determine the panel's power. Based on the power change from the previous state, the controller pushes the operating conditions towards the maximum power point. There are four possible scenarios which are determined by the change in power and the previous perturbation direction. These scenarios are shown in FIG. 7 and summarized in Table I.

TABLE 1

Four possible P&O scenarios

| Perturbation | Change in Power | Scenario | Next Perturbation |
|---|---|---|---|
| Positive | Positive | (A) | Positive |
| Positive | Negative | (B) | Negative |
| Negative | Positive | (C) | Negative |
| Negative | Negative | (D) | Positive |

Although the exact operating power is calculated, this value is not required by the controller. From Table I it can be understood that the controller only checks if the difference between $P_k$ and $P_{k-1}$ is positive or negative. Instead of calculating the operating power, a surrogate signal can be used to indirectly track the maximum power point. The only requirement is that the chosen signal follows the PV MPP characteristics regardless of the operating condition.

Voltage sensing can easily be performed with a voltage divider, which results in minimal cost and losses compared with other sensors such as current, temperature, or light intensity, which makes it a good choice for single sensor implementations [13]. However, it may not be possible to perform MPP tracking only by measuring the panel's output voltage unless the algorithm is designed for a specific power converter such as in [12-13]. As a result, to perform MPP tracking with only a voltage sensor, an alternate voltage parameter must be measured. In some converters, such as the discussed APWM CLL resonant converter, there are voltage parameters that meet this criteria. The peak voltage across the converters switches is given in (9) and can be seen to be a function of the input voltage and the duty cycle. As this voltage is on the x-axis of the V-P curve in FIG. 7 it is not a candidate. The resonant capacitor voltage is provided in (10) and is simplified in (11). It can be seen that this voltage is a sinusoidal waveform whose peak is a function of the input power and shifted up by a constant. Therefore, this voltage waveform follows the input panel power characteristics.

$$v_{s1_{max}} = v_{s2_{max}} = \frac{v_i}{1-D} \quad (9)$$

$$v_{cr} = v_{ds2} + \frac{v_{ds2} - v_{cr(0)} + \frac{p \times R \times \frac{n_2}{n_1}}{4L_0}}{\omega_0 Z} \cos(\omega_0 t) - \frac{i_{res(0)}}{\omega_0} \sin(\omega_0 t) + \frac{p \times R \times \frac{n_2}{n_1} \times L_{eq}}{L_0} \quad (10)$$

$$v_{cr} = p\left(\frac{R \times \frac{n_2}{n_1}}{4L_0 \omega_0 Z} + \frac{4\omega_0 Z \times \frac{n_2}{n_1} \times L_{eq}}{L_0}\right)\cos(\omega_0 t) + \alpha \quad (11)$$

$$v_{Lr} = v_{ds2} - v_{cr} \quad (12)$$

$$v_{Lr} = -v_{cr} \quad (13)$$

At the same time, the voltage across the resonant inductor is related to the resonant capacitor and switch voltage. This relation is provided in (12) and (13) when the switch is off and on respectively. Based on this, the voltage across the resonant inductor can also be utilized as an alternative signal to track the MPP. By maximizing this voltage, the input panel power will be indirectly maximized.

The single-sensor MPPT algorithm utilizes P&O based tracking. Instead of using a fixed step-size, it may be more efficient to implement an adaptive step-size algorithm as this provides faster tracking speed and lower oscillations near the MPP. Gradient based methods can be employed for adaptive step-size as they utilize the change in the measured parameter and the operating state. One benefit of this implementation for single-sensor tracking is that it does not require additional sensors or calculations. Such an implementation may help to increase the tracking speed during periods when the operating conditions change, which leads to a more stable system and higher overall extraction efficiency.

Figure 8:
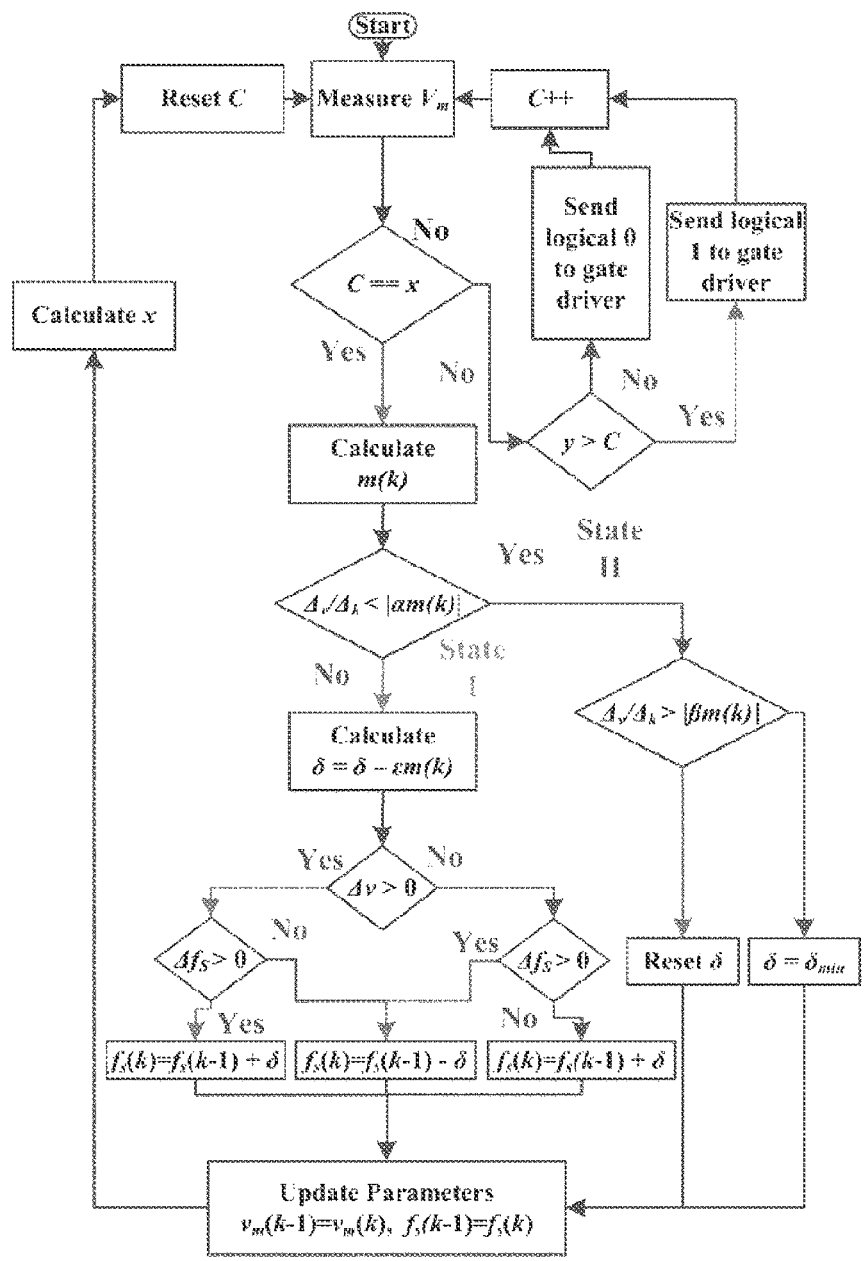
FIG. 8 shows a flowchart of the controller.

FIG. 8 shows flowchart 100 outlining the steps for an algorithm for the MPPT algorithm. Generally, the algorithm operates in two states, State I and State II. State I is the tracking state and occurs when the system is not operating near MPP. Each iteration (k), the controller senses the peak operating voltage of the desired component and along with the previous operating state determines the rate of change. When operating away from the MPP, the rate of change is large. The controller utilizes this large value to tune the step-size as shown in (14) to allow for faster tracking. As the operating parameter is perturbed, the rate of change decreases, and in turn the step-size decreases. If the rate of change is much smaller than the measured peak as indicated in (15), the controller transitions to the second state which is oscillation minimization. During State II the step-size is significantly reduced to allow for minimal oscillation around the MPP. If there is a change in the light intensity the calculated rate of change would be large according to (16), which alerts the controller to transition back to State I.

$$y = y - \frac{v_m(k) - v_m(k-1)}{f(k) - f(k-1)} \varepsilon_y \quad (14)$$

$$\frac{v_m(k) - v_m(k-1)}{f(k) - f(k-1)} \leq \beta \times v_m(k) \quad (15)$$

$$\frac{v_m(k) - v_m(k-1)}{f(k) - f(k-1)} \geq \gamma \times v_m(k) \quad (16)$$

Figure 9A:
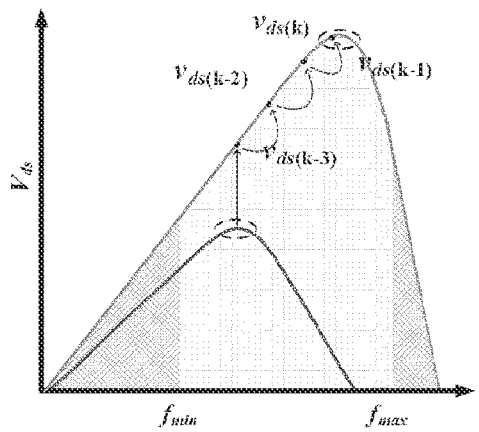
FIGS. 9a-9d show four possible tracking scenarios during converter operation.
Figure 9B:
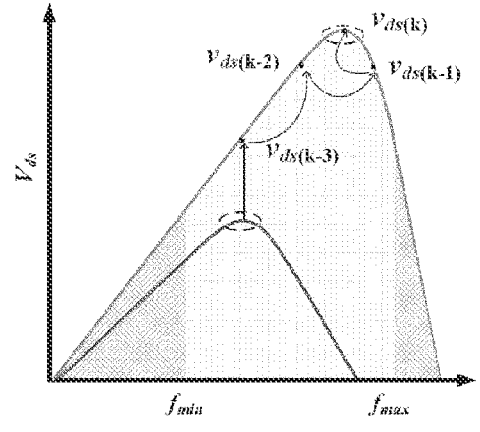
Figure 9C:
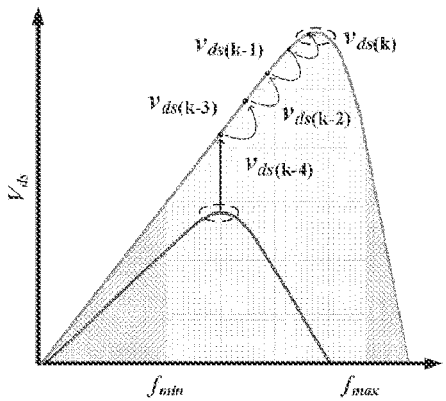
Figure 9D:
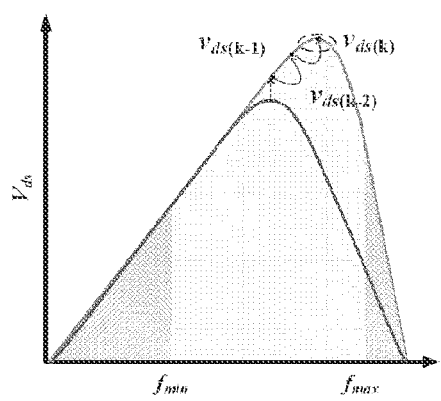

The algorithm is stable as it converges at the maximum power point. FIG. 9 shows four scenarios these waveforms where green area bounded by $d_{min}$ and $d_{max}$ represent operating condition where soft-switching is maintained. FIG. 9a shows the ideal situation, in which the system arrives at the MPP without an overshoot occurring. FIG. 9b shows the second scenario which is when the system overshot the MPP and arrived at a location where the calculated rate of change is close to zero. However, the system does not transition into State II as the change in the perturbed variable is high. This alerts the controller that the MPP was overshot and that the operating side has changed. The third scenario is shown in FIG. 9c which is when the perturbation parameter approaches zero. As with the previous scenario, the measured rate of change would be close to zero, however the change in the perturbed variable would also be zero. For the algorithm, this scenario may be avoided by having the controller operate with a minimum 2, such that the rate of change will only be close to zero when operating very close to the MPP.

To verify the performance of the system 20, simulation results were obtained on a 4 kW, 8 kV PV energy system consisting of two modules, the discussed single sensor MPP tracker and the voltage balancing controller. Each module consisted of nine 220 W PV panels in series to allow for an operating power of up to 2 kW.

Table II shows the design specifications of the system.

TABLE II

System design specifications & Converter parameters

| CONVERTER DESIGN SPECIFICATIONS | |
| --- | --- |
| Operating Frequency ($f_s$) | 230 kHz |
| Duty Cycle Range | 30% to 80% |
| PV Array Power | 4 kW |
| PV Array Voltage | 400 V |
| CONVERTER CIRCUIT PARAMETERS | |
| Input Capacitor ($C_{in}$) | 10 μF |
| DC-Link Capacitor ($C_1$) | 10 μF |
| Resonant Capacitor ($C_r$) | 100 nF |
| Input Inductor ($L_{in}$) | 22 μH |
| Magnetizing Inductance($L_m$) | 200 μH |
| Turns Ratio ($n_1$:$n_2$) | 1:2 |
| Output Inductor ($L_o$) | 40 μH |
| Output Capacitor ($C_{O1}$-$C_{O3}$) | 5 μF |

Figure 10A:
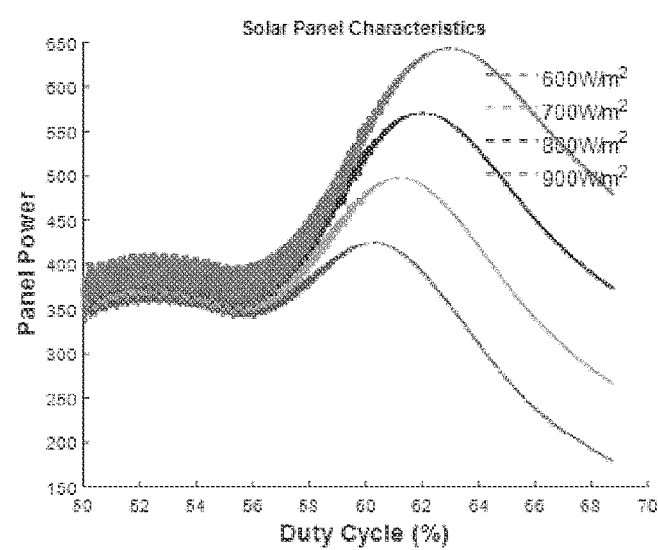
FIG. 10a shows operating power.
Figure 10B:
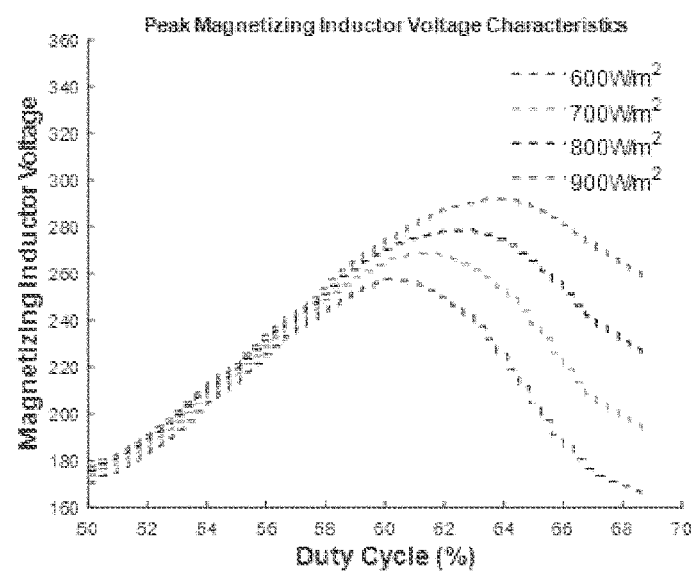
FIG. 10b shows peak resonant inductor voltage as a function of the converter's operating duty cycle with a 200 W panel at the input.

First, in order to confirm the chosen voltage could be used as a replacement for the input power, the operating duty cycle of the top module was varied from 40% to 70% at different light intensity conditions. FIGS. 10a and 10b shows plots of both the input power (a) and the chosen voltage (b) at light intensities 600 W/m², 700 W/m², 800 W/m², and 900 W/m2 respectively. Here it can be seen that the peak voltage and the peak power occur at the same duty cycle regardless of the light intensity. This confirms that maximizing the peak inductor voltage will indirectly maximize the input panel power.

In order to test the designed single-sensor MPP controller and the power balancing technique, the top module's PV array light intensity was varied between 600 W/m² and 900 W/m² while the resonant inductor voltage was sent to the MPP controller. The light intensity was varied every 0.05 s. The output voltage of each module was sent to a separate power balancing controller that would vary the VQ's switch to balance the power flow.

FIGS. 11a, 11b, 12a, 12b and 13 contains the results of this simulation. From FIG. 11a it can be seen the single-sensor controller successfully brought the operation power to the maximum at all operating conditions even through it did not measure the input parameters of the panel. From the zoom-in provided in FIG. 11b the extraction efficiency was greater than 99% regardless of the light intensity.

Figure 12A:
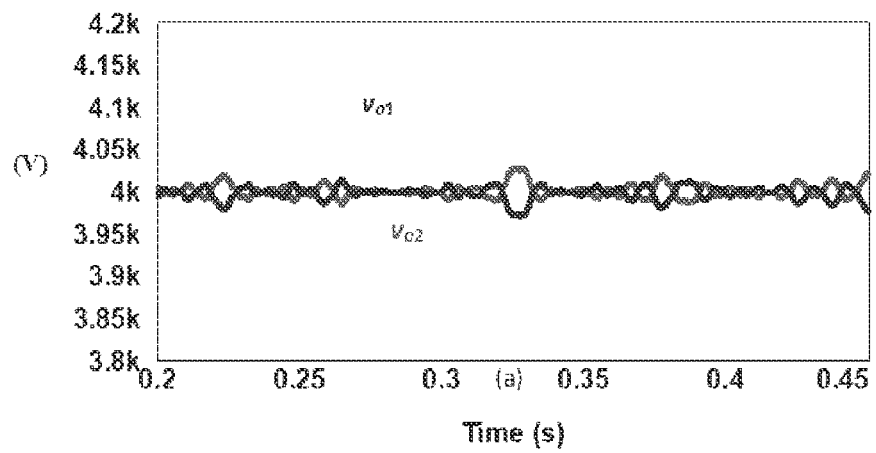
FIG. 12a shows an output voltage of module 1 and module 2.

This confirms that the oscillation mitigation portion of the designed controller was successful in improving the extraction efficiency. FIG. 11c shows the operating power of the second module which was kept constant throughout operation. When the light intensity of the first module changed there was a dip in the operating power of the second module. This makes sense as the output resistance seen by the second module changed due to the increase in the first modules power level. Regardless, the algorithm was able to bring the operating power back to the maximum. The output voltage of each module is shown in FIG. 12a which is at 4 kV at steady state operation.

Figure 12B:
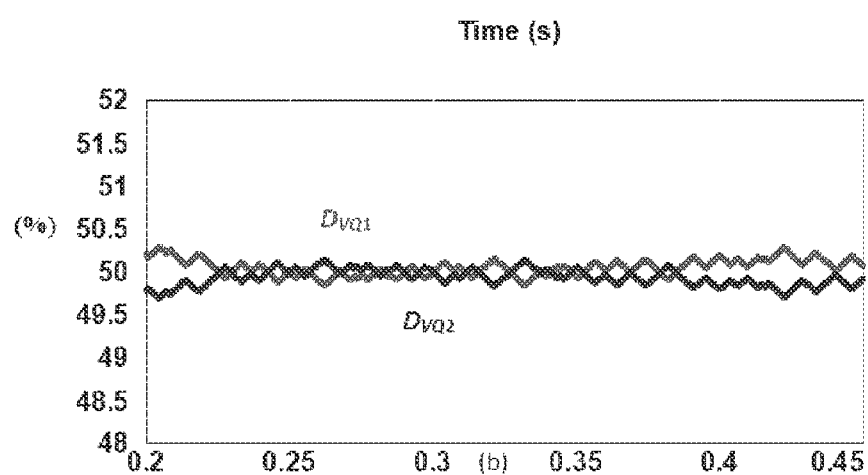
FIG. 12b shows a duty cycle of the VQ switch.
Figure 13:
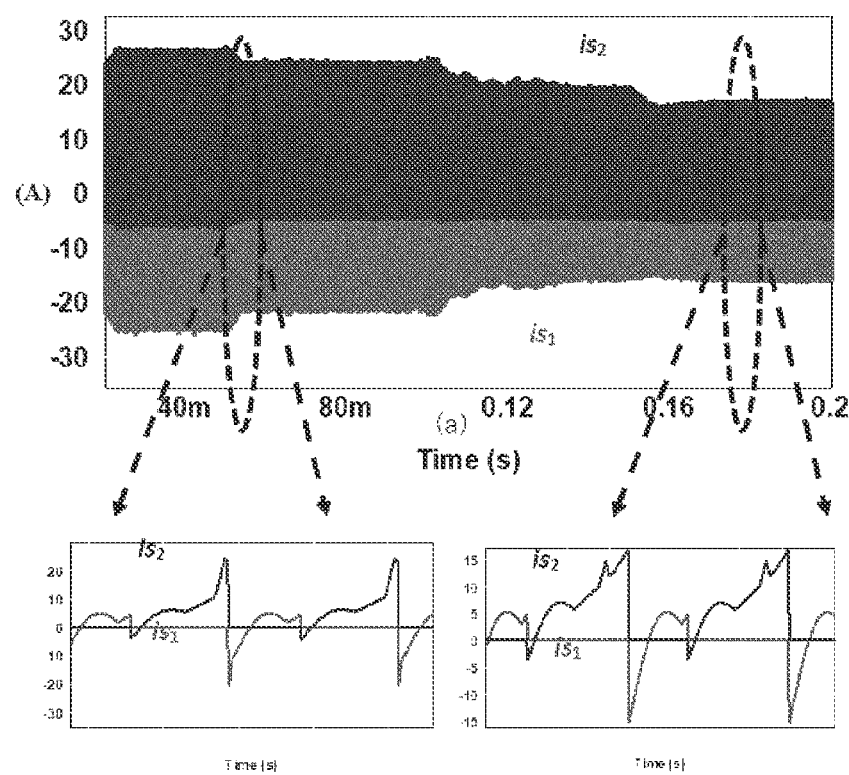
FIG. 13 shows a switch current of the first module.

When the light intensity of the first module change the voltages became unbalanced, however the controller was able to rebalance the voltage. FIG. 12b shows that when the operating power of the first module is much greater than the second module the duty cycle of the first aux switch is larger than the second switch to allow for power to flow to the second module. FIG. 13 contains the first modules switch current waveforms which are shown to operate under turn-on soft switching condition.

Figure 14:
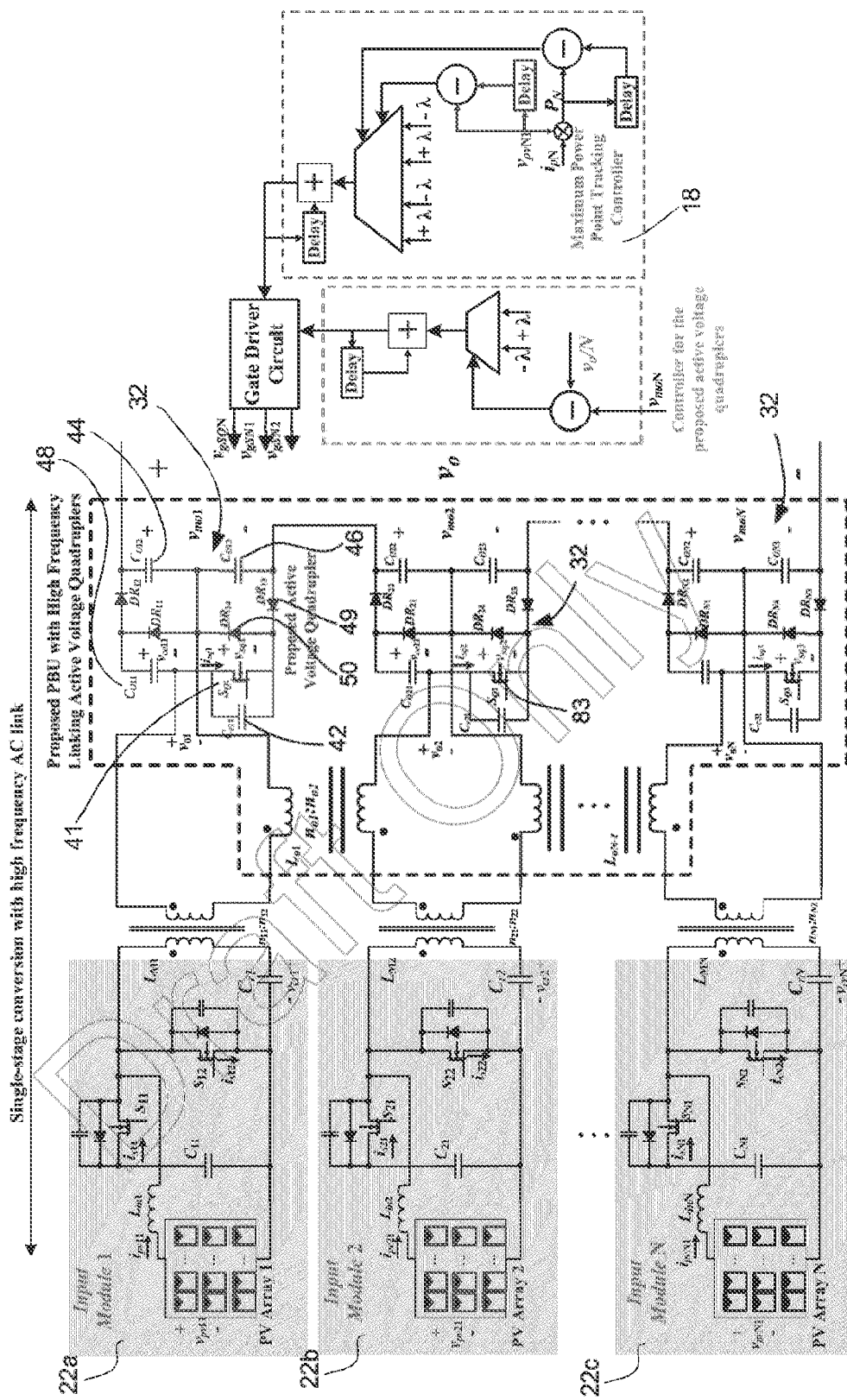
FIG. 14 shows a modular PV converter system with inter-connecting soft-switched active voltage quadruplers (AVQ) as a power balance unit PBU.

In another implementation, modular DC/DC converter system 40 comprises modules 22a-n, in which each front-end of each module 22a-n comprises an isolated resonant converter, and the output inductor of each module 22a-n is coupled together to allow for interconnected power flow, as shown in FIG. 14. This power flow is regulated with an active voltage quadrupler (AVQ) 32 comprising an active switch $S_{Q1}$ 41 and a resonant capacitor $C_{r11}$ 42. Similar to the configuration of FIG. 4, the gain of a single module 22a-n comprises the boost, CLL resonant, and VQ stages. The configuration shown in FIG. 14 allows for a wider range of soft-switching operation as well as control over the peak switch voltage. The resonant capacitor $C_{r11}$ 42 allows for the switch $S_{Q1}$ 41 voltage to reach zero before the turn on gate signal is applied to the switch $S_{Q1}$ 41 while also allowing the peak switch voltage to be a function of the duty cycle. By moving the switch $S_{Q1}$ 41 to the lower left of the AVQ 32, the resonant current flowing through the switch $S_{Q1}$ 41 will be negative for an increased period of time for one switching cycle, allowing for a lower peak switch current and a wider soft switching operating range.

Figure 15:
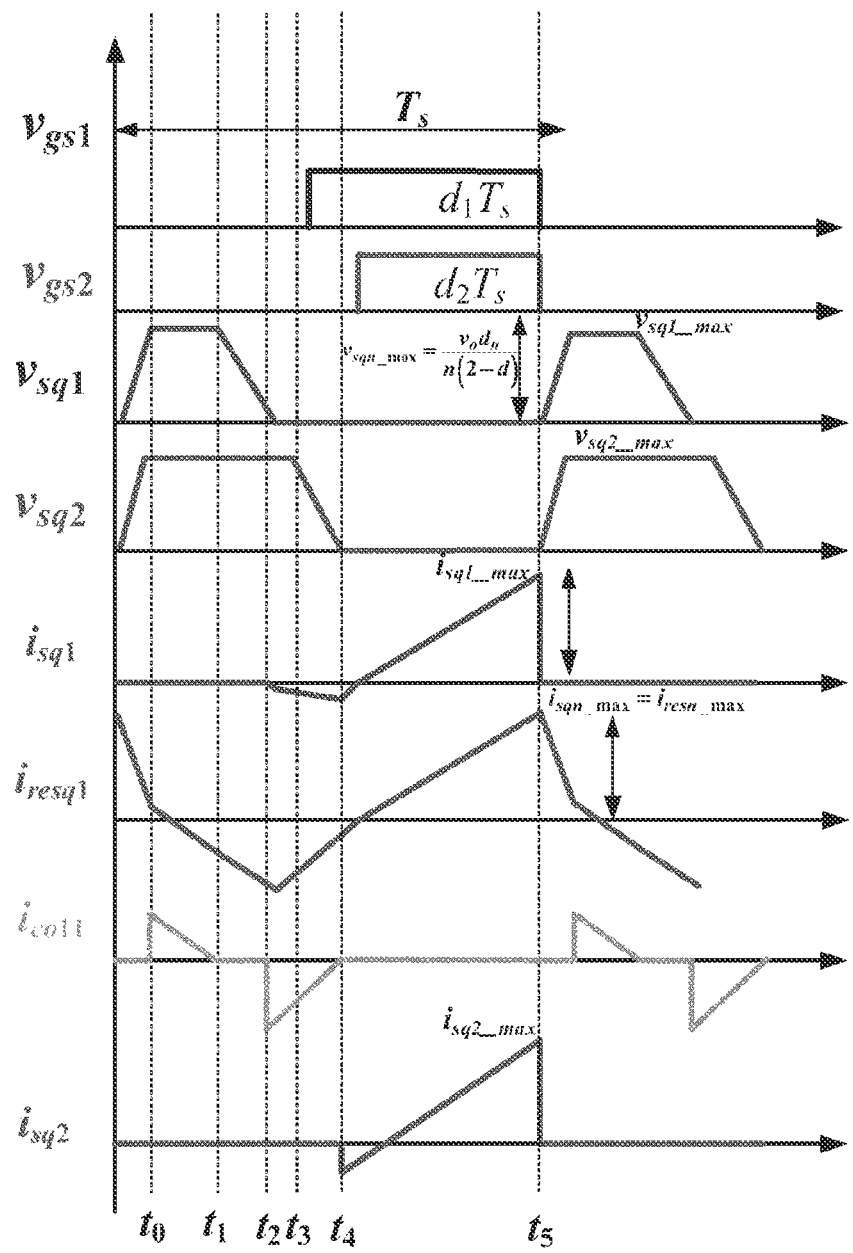
FIG. 15 shows operating waveforms with two AVQ modules.

The summation of the voltage across the two output capacitors $C_{o12}$ 44, $C_{o13}$ 46 of the voltage quadrupler 32 are equal to the total module output voltage (17). However, the voltage across these two capacitors $C_{o12}$ 44, $C_{o13}$ 46 are not equal and are a function of the active switch's duty cycle. The voltages across the two capacitors $C_{o12}$ 44, $C_{o13}$ 46 are provided in (18) and (19), respectively. The voltage across the input capacitor $C_{o11}$ 48 of the voltage quadrupler 32 is equal to the voltage across capacitor $C_{o11}$ 48 (19) and from this the peak voltage across the active switch $S_{Q1}$ 41 can be determined as given in (20). The operating waveforms of two modules 22a, 22b with the active voltage quadrupler 32 are shown in FIG. 15. When the gate signal is removed from the switch $S_{Q1}$ 41, the resonant current charges the resonant capacitor $C_{r11}$ 42, and increases the switch $S_{Q1}$ 41 voltage to its maximum. During this time ($t_0$-$t_1$) the resonant current is decreasing and once it crosses zero, the diodes $D_{r13}$ 49 and $D_{r14}$ 50 change polarity, resulting in the discharge of the resonant capacitor $C_{r11}$ 42 ($t_1$-$t_2$). Once fully discharged, the resonant current is split between the capacitor Con 48 and $v_{sq}$'s anti-parallel diode. As the gate signal is applied before this current is positive, soft-switching operation is achieved ($t_2$-$t_4$).

$$v_{mo1} = v_{co12} + v_{co13} \tag{17}$$

-continued $$v_{co11} = v_{co13} = \frac{v_o(1-d_k)}{n(2-d_k)} \quad (18)$$

$$v_{co12} = \frac{v_o d_k}{n(1-d_k)} \quad (19)$$

$$v_{sqn\_max} = \frac{v_o d_k}{n(2-d_k)} \quad (20)$$

In order to confirm the accuracy of the system, a two-module system with a rated power of 4 kW and 10 kV output operating at a frequency of 230 kHz was tested in PSIM.

Table III lists the parameters of the utilized modules.

TABLE III

DESIGNED SYSTEM PARAMETERS

| | Simulation | Scaled-down proof-of-concept hardware prototype |
|---|---|---|
| Rated Power Per Module | 2 kW | 200 W |
| Input Inductance | 40 µH | 43 µH |
| Resonant Inductance | 400 µH | 400 µH |
| Output Inductance | 200 µH | 43 µH |
| Boost Capacitance | 10 µF | 10 µF |
| VQ Capacitance | 25 µF | 25 µF |
| Operating Frequency | 230 kHz | 230 kHz |

Figure 16A:
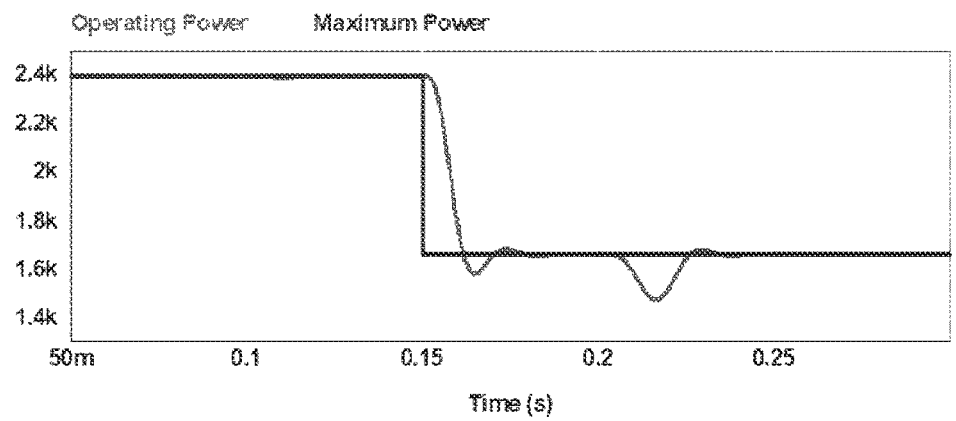
FIG. 16a shows the operating power of module 1.
Figure 16B:
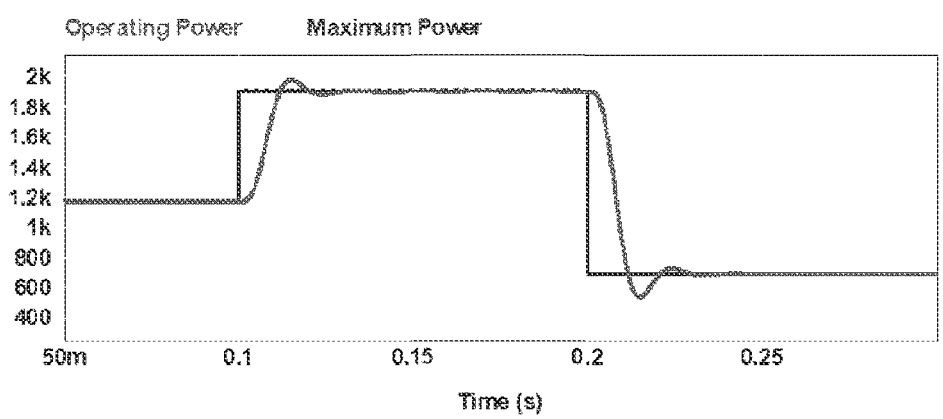
FIG. 16b shows the operating power of module 2.
Figure 17:
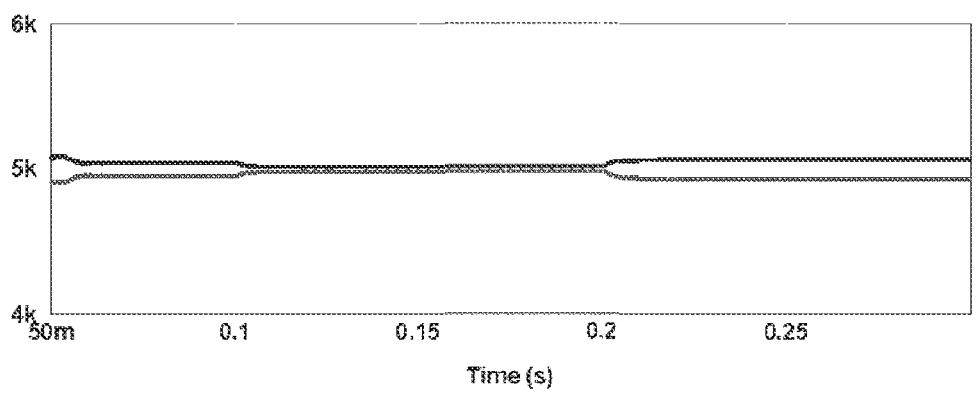
FIG. 17 shows the operating power of the two modules.

From FIGS. 16a and 16b it can be seen that the system 40 is able to achieve maximum power extraction at different power levels with this circuit configuration for both module 1 22a (FIG. 16a) and module 2 22b (FIG. 16b). It can be seen at 0.2 s that the operating power level of module 2 22b drops sharply, however this also had an impact on the power extraction ability of module 1 22a. This is due to the operation of the voltage balancer as shown in FIG. 17. When the power level changes, the voltage balancer changes the operating condition of both active voltage quadruplers 32 to maintain a balanced output voltage across each module 22a, 22b. This in turn changed the required duty cycle for the system to extract the maximum power. It can be seen that the system does return to the maximum power level within 0.3 s which confirms that both the maximum power extraction algorithm and the voltage balancer algorithm are able to function independently.

Figure 18A:
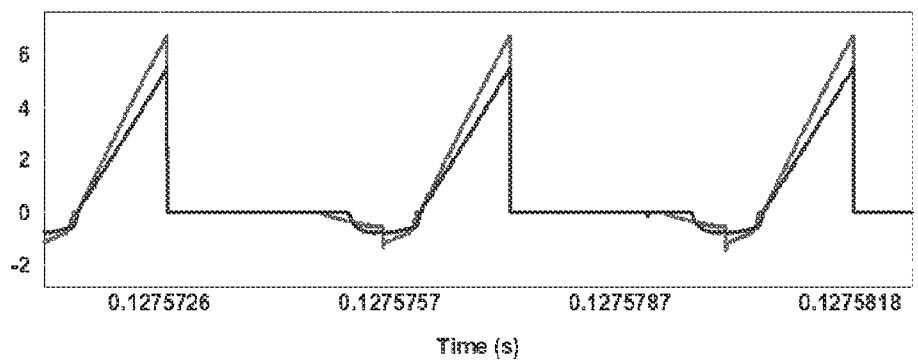
FIG. 18a shows an active voltage quadrupler switch current.
Figure 18B:
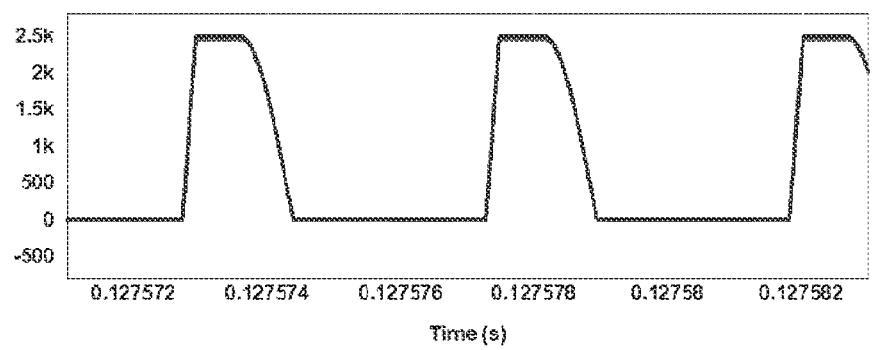
FIG. 18b shows an active voltage quadrupler switch voltage.

The switch voltage and current of the active voltage quadrupler 32 are provided in FIG. 18a and FIG. 18b respectively. The switch $S_{Q1}$ 41 in each module 22a, 22b is gated such that they transition to their off state at the same time. The additional resonant capacitor $C_{r11}$ 42 acts to delay the voltage rise across the switch $S_{Q1}$ 41 which improves the turn off operation of the switch $S_{Q1}$ 41. It can also be seen that the switch $S_{Q1}$ 41 voltage reaches zero while the resonant current is negative, which implies at the turn on condition the switch current is negative and flows through its antiparallel diode. This confirms the active voltage quadrupler 32 can achieve zero voltage switching (ZVS) operation.

The methods described with reference to FIGS. 4 and 14 use a linear configuration where all modules 22a-n are coupled to one another with the exception of modules $M_1$ and $M_N$. As modules $M_2$ to $M_{N-1}$ consist of two coupled inductors, to achieve the same voltage level at the input to their active voltage quadrupler 32 their inductance would need to be four times smaller than modules $M_1$ and $M_N$. This implies that the design of each module 22a-n is different which increases the difficulty of adding additional modules to an already built system.

Figure 19:
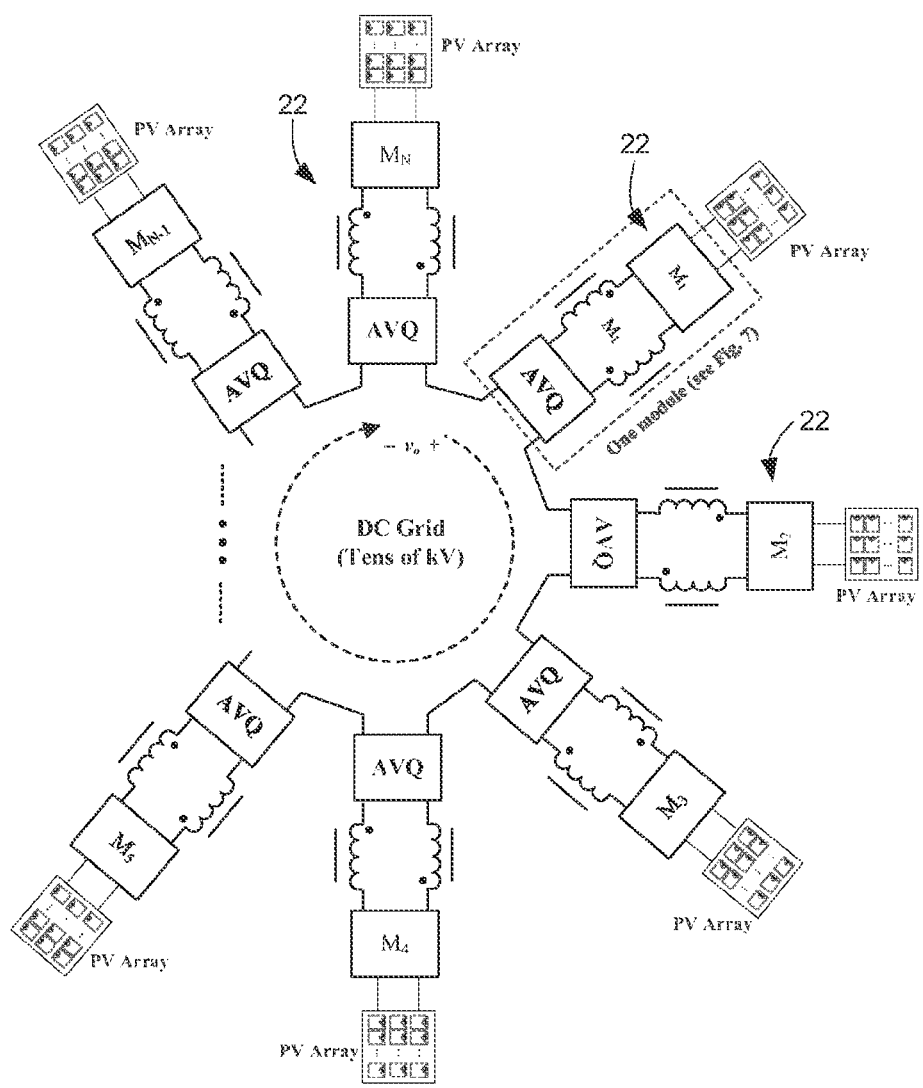
FIG. 19 shows a modular PV step-up converter with a circular configuration.

In order to simplify the module design and to easily allow for module expansion, an exemplary circular configuration 51 (i.e. a ring structure with the modular system) is shown in FIG. 19. This particular configuration allows for module $M_1$ 22 to be coupled to module $M_N$ 22. As a result, each module 22 is coupled to two modules 22, improving the voltage balancing capabilities and module expansion capabilities.

Figure 20:
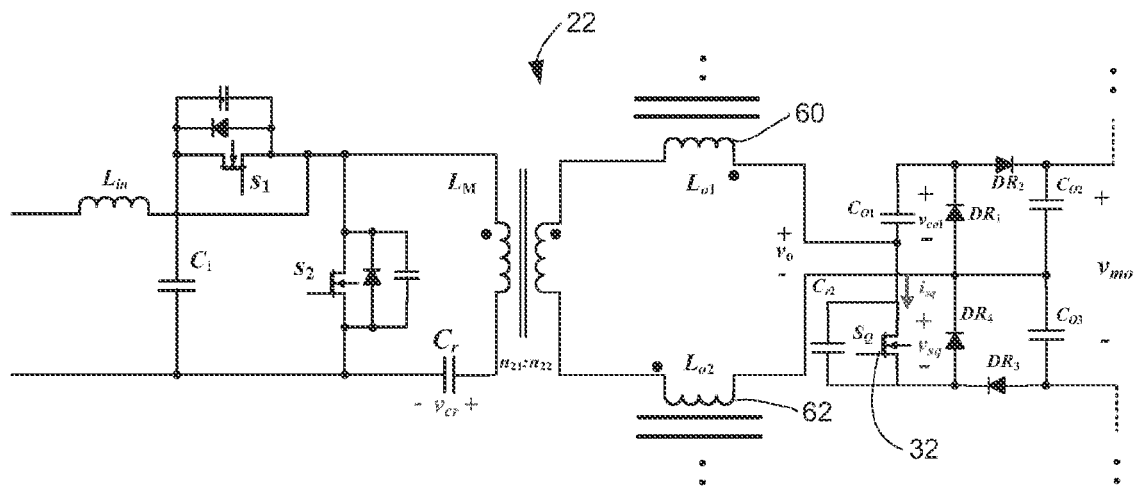
FIG. 20 shows an example of a module for the circular configuration.

An example of a single module 22 is shown in FIG. 20, in which two output inductors $L_{o1}$ 60 and $L_{o2}$ 62 are coupled to two other modules. As all modules 22 are identical, an additional module 22 can be added between any two existing modules 22 without needing different component or component parameters. Further, the gating technique of the AVQ switch $S_Q$ 32 has been modified to improve over the linear configuration. By gating the switches $S_Q$ 32 such they turn on at the same time, both the time at which the switch $S_Q$ 32 voltage rises and falls can be controlled with the duty cycle. This allows for more control over the input voltage waveform seen by the AVQ and as a result expands the operating range at which the output voltage can be balanced.

Figure 21A:
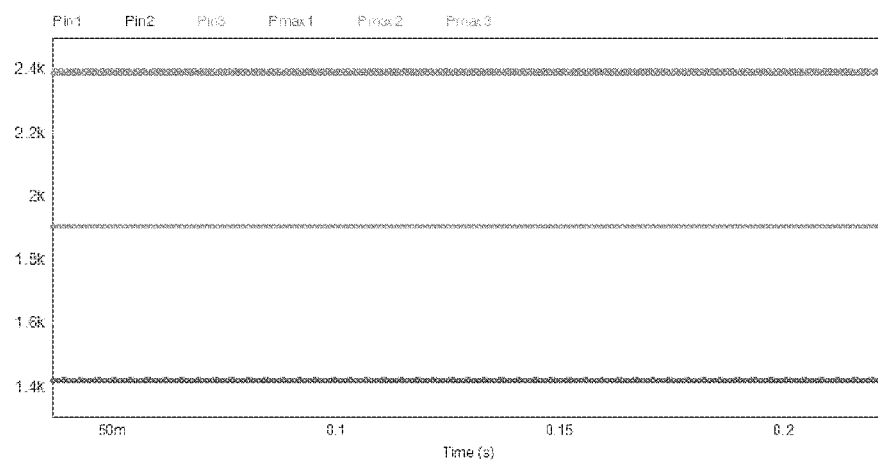
FIG. 21a shows the operating power of a module.
Figure 21B:
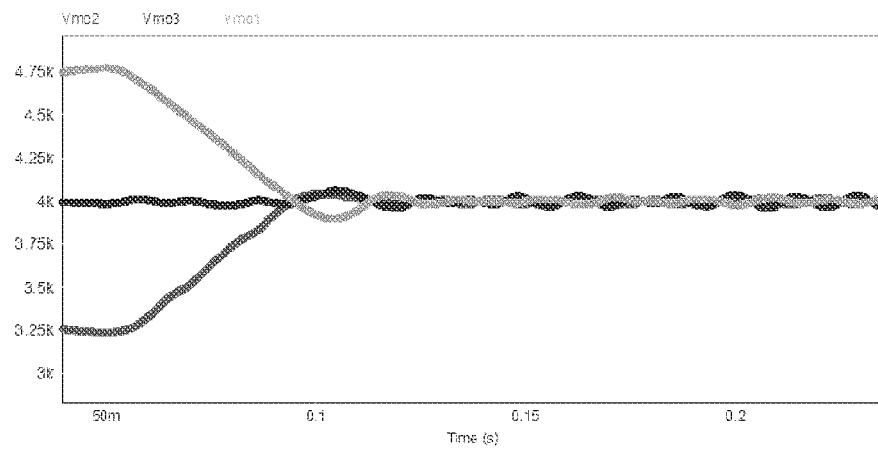
FIG. 21b shows the output voltage of a module.
Figure 22A:
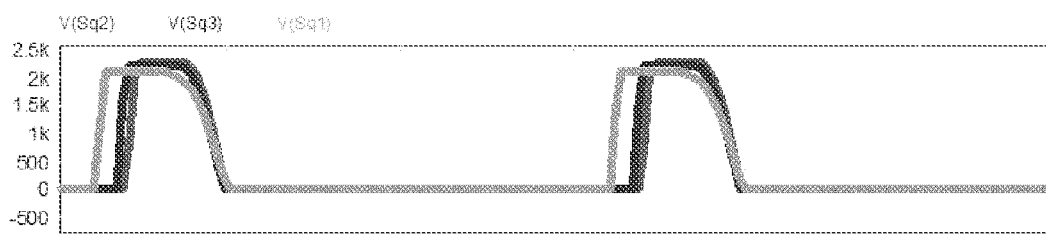
FIG. 22a shows an active voltage quadrupler switch current.
Figure 22B:
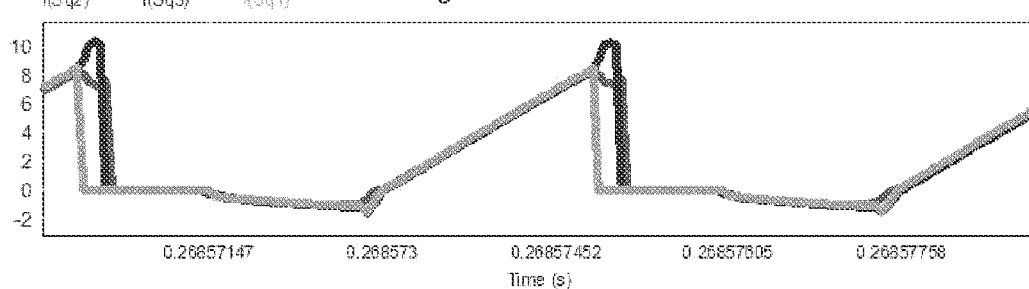
FIG. 22b shows an active voltage quadrupler switch voltage.
Figure 23A:
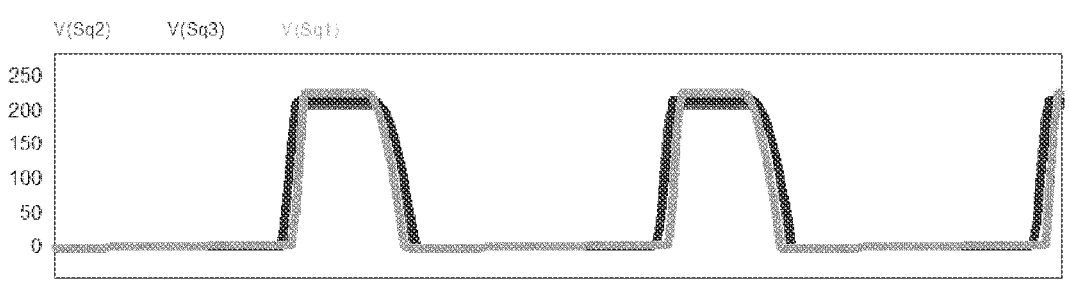
FIG. 23a shows a scaled down active voltage quadrupler switch current.
Figure 23B:
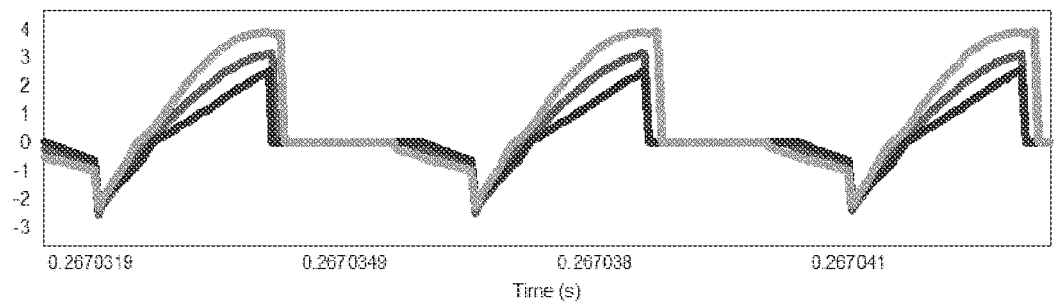
FIG. 23b shows an active voltage quadrupler switch voltage.

In order to confirm the operation of the circular configuration 51, a three-module system was tested in PSIM with both a rated and scaled-down version. The operating power level of each module 22 is shown in FIG. 21a, and the respective output voltage is shown in FIG. 21b. It can be seen that all modules 22 were operating at their respective maximum power level as their input power overlapped their theoretical maximum. The voltage balancer algorithm was delayed until 50 ms to show that under normal operation the voltage across each module is unbalanced. At 50 ms the voltage balancer algorithm is activated and it can be seen that the voltage across each module 22 became balanced within 40 ms and reached steady state after 60 ms. FIG. 22 shows contains the AVQ switch $S_Q$ 32 voltage and current of each module. Due to the utilized gating technique, each switch turns on at the same instant. This implies the switches $S_Q$ 32 turn off at different conditions and as a result the voltage across each switch $S_Q$ 32 rises at a different time which can be seen in FIG. 22. This can also be seen in the scaled down version's waveforms shown in FIG. 23.

Figure 24A:
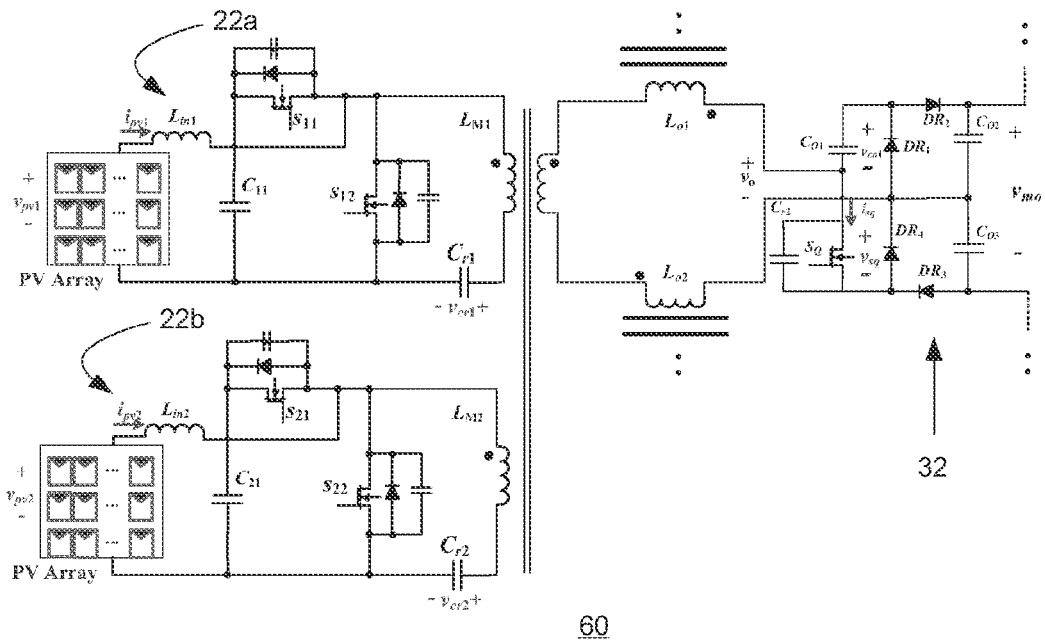
FIG. 24a shows a topology of a front-end DC/AC stage, in another embodiment.
Figure 24B:
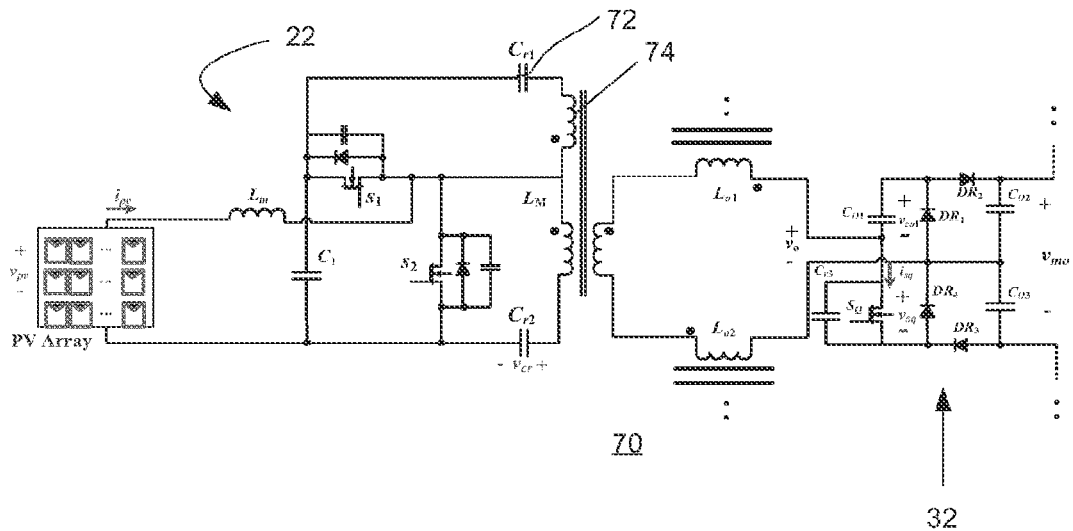
FIG. 24b shows a topology of a front-end DC/AC stage, in another embodiment.

As described above, the DC/DC isolated topology essentially comprises a high frequency DC/AC inversion and a high frequency AC/DC conversion via a high frequency transformer. The previous configurations, described above, comprise modifications of the active voltage quadrupler 32 which forms the output high frequency AC/DC conversion, in which the DC/AC inversion was the same for each configuration, however this stage may be modified to suit the required application, such as higher rated power or higher PV module output voltage. Two such examples are provided in FIGS. 24a and 24b, respectively. FIG. 24a comprises a topology 60 which utilizes two high frequency DC/AC modules 22a. 22b that are individually coupled to the same active voltage quadrupler 32. This topology 60 reduces the number of AVQ modules 22 needed to provide power to the output, minimizing the number of components and cost of the system. This also allows for the DC/AC portion to be composed of lower rated components which further decreases the cost of the system. An alternative topology 70 is shown in FIG. 24b which utilizes a single DC/AC system but includes an additional resonant stage consisting on a resonant capacitor $C_{r1}$ 72 and an additional winding 74 added to the coupled inductor. This allows the system to operate at a higher switching frequency while still maintaining the same operating conditions found previously.

Figure 25:
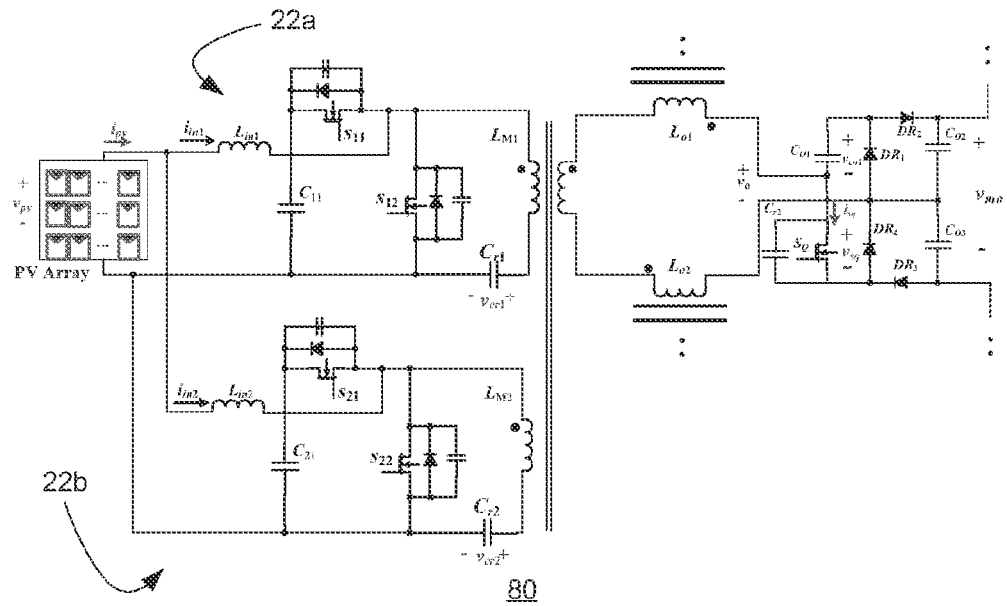
FIG. 25 shows a converter configuration with interleaved front-end high frequency DC/AC inversion, in another embodiment.

As shown in FIG. 25, the front-end topology may also be modified to use an interleaved approach. This topology 80 comprises two high frequency DC/AC modules 22a, 22b with their outputs coupled to a voltage quadrupler 32, however their inputs are connected in parallel and to the same PV array. The switching signals of the two high frequency DC/AC modules 22a, 22b are phase shifted by 180, which allows the input current ripple to be minimized. Further, as the PV current is split between the two modules 22a, 22b the rated current of the switches decreases and lower rated components can be used.

Figure 26:
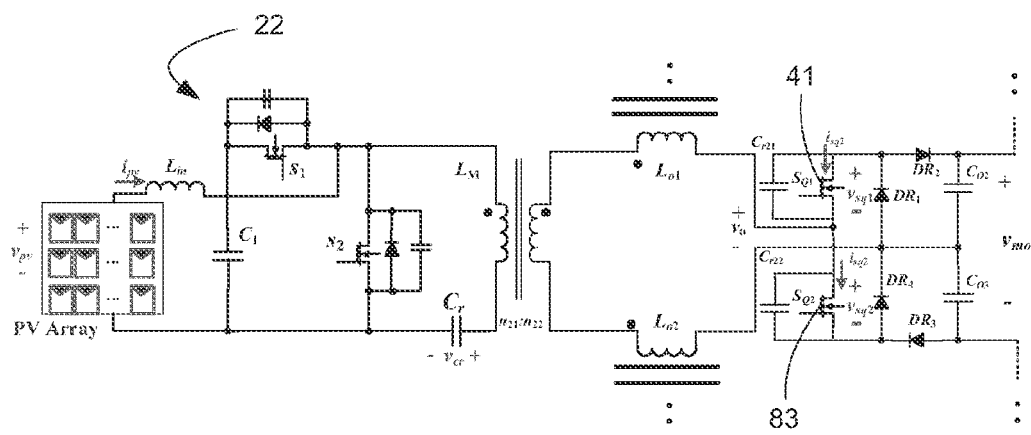
FIG. 26 shows an AVQ topology comprising dual switches.

While the topologies discussed above use an active voltage quadrupler with a switch replacing either the top or bottom capacitor from the front, the capacitor $C_{o1}$ and capacitor $C_{r2}$ may be replaced with switches $S_{Q1}$ 41 and $S_{Q2}$ 83 respectively, as shown in topology 82 in FIG. 26. By gating the switches $S_{Q1}$ 41, $S_{Q2}$ 83 asymmetrically, the direction of power flow can be controlled such that the power can be shared with either the top or bottom module regardless of the recipient modules operating state.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are described above with reference to block diagrams and/or operational illustrations of methods, systems, and computer program products. The operations/acts noted in the blocks may be skipped or occur out of the order as shown in any flow diagram. For example, two or more blocks shown in succession may be executed substantially concurrently or the blocks may sometimes be executed in the reverse order, depending upon the functionality/acts involved. While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as exemplary embodiments.

REFERENCES

[1] REN "The First decade: 2004-2014" report. http//www.ren21.net
[2] REN "2020 Global Status Report" report. https://www.ren21.net/wp-content/uploads/2019/05/gsr_2020_full_report_en.pdf
[3] J. Hu, P. Joebges and R. W. De Doncker, "Maximum power point tracking control of a high power dc-dc converter for PV integration in MVDC distribution grids," 2017 IEEE Applied Power Electronics Conference and Exposition (APEC), Tampa, F L, 2017, pp. 1259-1266,
[4] R. Kadri, J. Gaubert and G. Champenois, "Nondissipative String Current Diverter for Solving the Cascaded DC-DC Converter Connection Problem in Photovoltaic Power Generation System," in IEEE Transactions on Power Electronics, vol. 27, no. 3, pp. 1249-1258, March 2012, doi:
[5] X. Li, M. Zhu, M. Su, J. Ma, Y. Li and X. Cai, "Input-Independent and Output-Series Connected Modular DC-DC Converter With Intermodule Power Balancing Units for MVdc Integration of Distributed PV," in IEEE Transactions on Power Electronics, vol. 35, no. 2, pp. 1622-1636, February 2020,
[6] Y. Lu, K. Sun, H. Wu, X. Dong and Y. Xing, "A Three-Port Converter Based Distributed DC Grid Connected PV System With Autonomous Output Voltage Sharing Control," in IEEE Transactions on Power Electronics, vol. 34, no. 1, pp. 325-339, January 2019,
[7] Y. Zhuang et al., "A Multiport Modular DC-DC Converter with Low-Loss Series LC Power Balancing Unit for MVDC Interface of Distributed Photovoltaics," in IEEE Transactions on Power Electronics
[8] M. Metry, M. B. Shadmand, R. S. Balog and H. A. Rub, "A variable step-size MPPT for sensorless current model predictive control for photovoltaic systems," 2016 IEEE Energy Conversion Congress and Exposition (ECCE), pp. 1-8,
[9] M. Metry, M. B. Shadmand, R. S. Balog and H. Abu-Rub, "MPPT of Photovoltaic Systems Using Sensorless Current-Based Model Predictive Control," IEEE Trans. on Industry Applications, vol. 53, no. 2, pp. 1157-1167, March-April 2017,
[10] C. Lohmeier, J. Zeng, W. Qiao, L. Qu and J. Hudgins, "A current-sensorless MPPT quasi-double-boost converter for PV systems," 2011 IEEE Energy Conversion Congress and Exposition, 2011,
[11] J. Ahmed and Z. Salam, "An Enhanced Adaptive P&O MPPT for Fast and Efficient Tracking Under Varying Environmental Conditions," IEEE Trans. on Sustainable Energy, vol. 9, no. 3, pp. 1487-1496, July 2018
[12] M. Killi and S. Samanta, "An Adaptive Voltage-Sensor-Based MPPT for Photovoltaic Systems With SEPIC Converter Including Steady-State and Drift Analysis," IEEE Trans. on Industrial Electronics, vol. 62, no. 12, pp. 7609-7619, December 2015
[13] M. Killi and S. Samanta, "Voltage-Sensor-Based MPPT for Stand-Alone PV Systems Through Voltage Reference Control," IEEE Journal of Emerging and Selected Topics in Power Electronics, vol. 7, no. 2, pp. 1399-1407, June

What is claimed is:

1. A modular single-stage photovoltaic step-up converter system with integrated power balancing, the converter system comprising:
    an input stage comprising at least one converter module, the at least one converter module comprising a single voltage-sensor based maximum power point (MPP) tracking controller and a power circuit, wherein the power circuit in each at least one converter module comprises an integrated boost and a CLL resonant converter which allows for both MPP tracking and soft-switching operation;
    an output stage comprising an active voltage quadrupler (VQ) circuit for achieving balanced output voltages amongst each of the at least one converter modules, and wherein the least one converter modules are coupled together by an output inductor, along with duty ratio control of the active VQ circuit, and whereby natural output voltage balancing is achieved without using additional power circuit components.

2. The system of claim 1, wherein a resonant inductor is coupled with the active VQ to provide isolation between the input stage and the output stage.

3. The system of claim 2, wherein the maximum power point (MPP) tracking and the soft-switching operation is performed with a single voltage sensor, and operates independently of the active VQ circuit.

4. The system of claim 3, wherein the soft-switching operation is capable of loss-less switching for over 90 percent of an operating range of the system.

5. The system of claim 4, wherein the soft-switching operation has an efficiency greater or equal to 96 percent.

6. The system of claim 5, wherein an overall gain of each at least one converter module is obtained by combining a gain of each individual stage.

7. The system of claim 6, wherein a total gain (M) of each at least one converter module is:

$$M = \frac{\sqrt{2(1 - \cos(2\pi(1 - D)))}}{\sqrt{\left(\frac{1 + \omega_r^2 Q^2 - \frac{1}{\omega_r^2} - (1 + k)(Q)^2}{1 + \omega_r^2 Q^2}\right)^2 + \left(\frac{Q - (1 + k)Q^2}{\omega_r(1 + \omega_r^2 Q^2)}\right)^2}}$$

where Q is a quality factor (5), k is a ratio between a resonant inductance and an output inductance, and w, is a ratio between an angular resonant frequency and an operating frequency.

8. The system of claim 7, wherein the single voltage sensor senses a voltage across the resonant inductor, and a sensed voltage signal is employed to track the MPP.

9. The system of claim 8, wherein the singular sensor signal is input into a single-sensor MPPT algorithm which uses perturb and observe (P&O) based tracking.

10. The system of claim 9, wherein the P&O based tracking implements adaptive step-sizing methods, thereby providing substantially faster tracking speed and lower oscillations near the MPP.

11. The system of claim 10, wherein adaptive step-sizing methods increase the tracking speed during periods when the operating conditions change, thereby leading to a more stable system and a higher overall extraction efficiency.

12. The system of claim 11, wherein the single-sensor MPPT algorithm comprises a first tracking state for when the system is not operating near MPP, and a second tracking state for when the system is operating near MPP.

13. The system of claim 11, whereby in each iteration (k), the MPP tracking controller senses a peak operating voltage of a desired component and along with the previous operating state to determine a rate of change.

14. The system of claim 13, wherein when operating away from the MPP, the rate of change is large the controller adjusts the step-size to allow for faster tracking, As the operating parameter is perturbed, the rate of change decreases, and in turn the step-size decreases.

15. The system of claim 14, wherein when the rate of change is substantially smaller than a measured peak, the controller transitions to the second tracking state wherein the step-size is substantially reduced to allow for minimal oscillation around the MPP.

16. A modular single-stage photovoltaic step-up converter system with integrated power balancing, the converter system comprising:
an input stage comprising at least one converter module, the at least one converter module comprising a single voltage-sensor based maximum power point (MPP) tracking controller and a power circuit; and
an output stage comprising an active voltage quadrupler (VQ) circuit for achieving balanced output voltages amongst each of the at least one converter modules, and
wherein the least one converter modules are coupled together in a circular configuration.

17. The system of claim 16, wherein each at least one converter module is coupled to least one converter module, thereby improving voltage balancing capabilities and module expansion capabilities.

18. The system of claim 16, wherein the power circuit in each at least one converter module comprises an integrated boost and a CLL resonant converter which allows for both MPP tracking and soft-switching operation.

19. A modular single-stage photovoltaic step-up converter system with integrated power balancing, the converter system comprising:
an input stage comprising a first converter module and a second converter module, each of the converter modules comprising a single voltage-sensor based maximum power point (MPP) tracking controller and a power circuit; and
an output stage comprising an active voltage quadrupler (VQ) circuit coupled to the first converter module and the second converter module.

20. The system of claim 19, wherein the power circuit in each at least one converter module comprises an integrated boost and a CLL resonant converter which allows for both MPP tracking and soft-switching operation.

21. A modular single-stage photovoltaic step-up converter system for a photo-voltaic (PV) array, the converter system comprising:
an input stage comprising a first converter module and a second converter module, each of the converter modules comprising a single voltage-sensor based maximum power point (MPP) tracking controller and a power circuit;
an output stage comprising an active voltage quadrupler (VQ) circuit coupled to the first converter module and the second converter module; and
wherein inputs to the first converter module and the second converter module are connected in parallel, and connected to the PV array.

22. The system of claim 21, wherein switching signals of the first converter module and the second converter module are phase shifted by 180 degrees, thereby minimizing input current ripple.

23. The system of claim 21, wherein the PV current is split between the first converter module and the second converter module.

24. The system of claim 21, wherein the power circuit in each at least one converter module comprises an integrated boost and a CLL resonant converter which allows for both MPP tracking and soft-switching operation.

25. A modular single-stage photovoltaic step-up converter system with integrated power balancing, the converter system comprising:
an input stage comprising a first converter module and a second converter module, each of the module comprising a single voltage-sensor based maximum power point (MPP) tracking controller and a power circuit; and
an output stage comprising an active voltage quadrupler (VQ) circuit for achieving balanced output voltages amongst each of the converter modules, wherein the VQ circuit comprises switches which are gated asymmetrically, whereby direction of power flow is controllable and the power can be shared with either the first converter module and the second converter module regardless of the recipient module's operating state.

26. The system of claim 25, wherein the power circuit in each at least one converter module comprises an integrated boost and a CLL resonant converter which allows for both MPP tracking and soft-switching operation.

* * * * *